(12) United States Patent
Tanaka

(10) Patent No.: US 7,506,833 B2
(45) Date of Patent: Mar. 24, 2009

(54) SEAT BELT RETRACTOR AND SEAT BELT APPARATUS

(75) Inventor: Koji Tanaka, Moriyama (JP)

(73) Assignee: Takata Corporation, Tokyo (JP)

( * ) Notice: Subject to any disclaimer, the term of this patent is extended or adjusted under 35 U.S.C. 154(b) by 383 days.

(21) Appl. No.: 11/159,287

(22) Filed: Jun. 23, 2005

(65) Prior Publication Data

US 2006/0016926 A1    Jan. 26, 2006

(30) Foreign Application Priority Data

Jul. 21, 2004    (JP)    ............... 2004-213159

(51) Int. Cl.
B60R 22/46    (2006.01)
B60R 22/34    (2006.01)
B60R 22/36    (2006.01)

(52) U.S. Cl. ............... 242/374; 242/390.8; 180/268; 280/806; 280/807; 297/477; 297/483

(58) Field of Classification Search ............... 242/374, 242/390.8; 280/805, 806, 807; 297/477, 297/483; 180/268
See application file for complete search history.

(56) References Cited

U.S. PATENT DOCUMENTS

| 4,741,556 | A | | 5/1988 | Nagashima |
| 4,946,196 | A | * | 8/1990 | Doty ............... 280/803 |
| 6,257,363 | B1 | | 7/2001 | Midorikawa et al. |
| 6,293,588 | B1 | * | 9/2001 | Clune ............... 280/808 |
| 6,332,629 | B1 | | 12/2001 | Midorikawa et al. |
| 6,374,168 | B1 | * | 4/2002 | Fujii ............... 701/45 |
| 6,485,057 | B1 | * | 11/2002 | Midorikawa et al. ...... 280/807 |
| 6,499,554 | B1 | | 12/2002 | Yano et al. |
| 6,772,973 | B2 | * | 8/2004 | Fujii et al. ............... 242/390.8 |
| 2002/0125360 | A1 | * | 9/2002 | Peter ............... 242/374 |
| 2003/0094534 | A1 | | 5/2003 | Fujii et al. |
| 2003/0178836 | A1 | * | 9/2003 | Viano et al. ............... 280/806 |

FOREIGN PATENT DOCUMENTS

| DE | 4332205 A1 | 3/1995 |
| DE | 10204476 A1 | 8/2003 |
| EP | 0893313 A2 | 1/1999 |
| JP | 59045241 | 3/1984 |
| JP | 59045243 | 3/1984 |
| JP | 61268551 | 11/1986 |
| JP | 62074747 | 4/1987 |
| JP | 10167007 | 6/1998 |
| JP | 2000-135969 | 5/2000 |

* cited by examiner

Primary Examiner—Peter M Cuomo
Assistant Examiner—Stefan Kruer
(74) Attorney, Agent, or Firm—Manabu Kanesaka

(57) ABSTRACT

A seat belt retractor includes a spring for rotating a reel in a belt winding direction to wind up a seat belt, and a motor for generating rotational power capable of rotating the reel in the belt winding direction to wind up the seat belt. A motor control unit controls the motor to generate the rotational power to wind up the seat belt with a desired winding force.

3 Claims, 15 Drawing Sheets

Fig. 8(a)
Fig. 8(b)
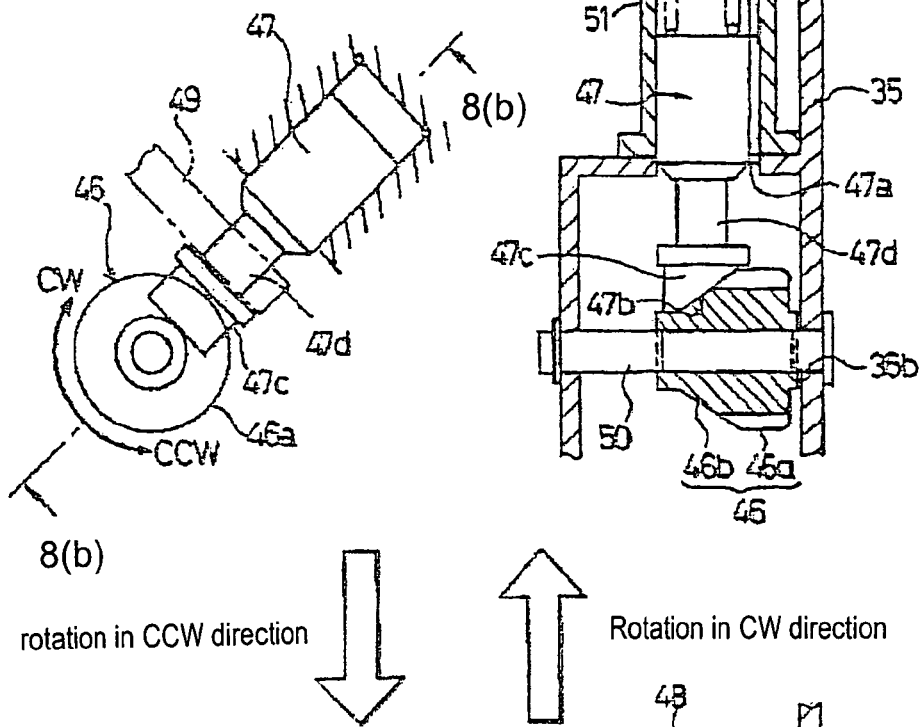
rotation in CCW direction
Rotation in CW direction
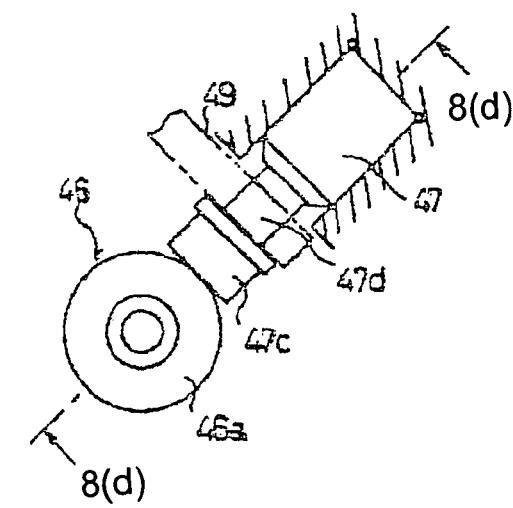
Fig. 8(c)           Fig. 8(d)

SEAT BELT RETRACTOR AND SEAT BELT APPARATUS

BACKGROUND OF THE INVENTION AND RELATED ART STATEMENT

The present invention relates to a seat belt retractor installed in a vehicle such as an automobile, a working vehicle, or the like for winding up a seat belt to restrain and protect an occupant, and relates to a seat belt apparatus with the seat belt retractor. More particularly, the present invention relates to a seat belt retractor for winding up a seat belt onto a reel by driving torque of a motor, and relates to a seat belt apparatus with the seat belt retractor.

A seat belt apparatus installed in a vehicle seat is an apparatus for restraining rapid movement of an occupant due to acceleration caused by a vehicle collision, thereby providing safety of the occupant. The seat belt apparatus generally comprises a seat belt (webbing), a tongue attached to the seat belt, a buckle mounted to a vehicle seat for engaging the tongue, a retractor, and the like.

The retractor houses the seat belt by winding up the seat belt onto a take-up member (reel, bobbin, or spool) by urging force of a spring. In addition, the retractor locks the take-up member from rotating in the belt withdrawing direction with an emergency locking mechanism (ELR mechanism) upon a vehicle collision, i.e. when an impact acts on the vehicle. When the seat belt is locked, the occupant rapidly moving forward is restrained.

In a conventional seat belt retractor, a rotational speed of a motor is reduced and transmitted to a take-up member by a power transmission mechanism of a gear train composed of a plurality of gears, so that a seat belt is wound up by a take-up member (i.e. motor retractor). In such a seat belt retractor, a detection device is further provided for detecting a possible collision of a vehicle, so that the motor winds the seat belt stepwise according to a possibility of a collision (for example, Patent Reference 1).

Patent Reference 1: Japanese Patent Publication (Kokai) No. 2000-52925

In the conventional seat belt retractor, only when a possible collision of the vehicle is detected, the motor operates at just two winding levels to tighten the seat belt according to a possibility of a collision. An individual tends to have a wide range of preference regarding tightness of a seat belt during normal driving. For example, a person may like to fasten the seat belt tightly because of sense of safety, while another person may like to fasten the seat belt softly because of comfort. In the conventional seat belt retractor, it is difficult to control a degree of the tightness according to individual preference.

In view of the problems described above, an object of the present invention to provide a seat belt retractor and a seat belt apparatus capable of adjusting tension of a seat belt according to individual preference.

Further objects and advantages of the invention will be apparent from the following description of the invention.

SUMMARY OF THE INVENTION

In order to achieve the objects described above, according to the present invention, a seat belt retractor comprises a spring for rotating a reel in a belt winding direction to wind up a seat belt; a motor for generating rotational power capable of rotating the reel in the belt winding direction to wind up the seat belt; and a motor control unit for controlling the motor to generate the rotational power to wind up the seat belt with a desired winding force.

According to the present invention, it is preferable that a clutch mechanism is provided on a power transmission path between the motor and the reel to switch between a mode allowing the transmission of power and a mode halting the transmission.

According to the present invention, it is preferable that, when the seat belt is wound up, the motor is connected to the spring to generate urging force, thereby generating the desired winding force.

According to the present invention, it is preferable to further comprise a setting unit to be operated by an occupant to set the desired winding force relative to the motor control unit.

According to the present invention, a seat belt apparatus comprises a seat belt; a tongue attached to the seat belt; a buckle for engaging the tongue according to an occupant choice; a spring for rotating a reel fixed to an end of the seat belt in a belt winding direction to wind up the seat belt; a motor for generating rotational power to rotate the reel in the belt winding direction to wind up the seat belt; and a motor control unit for controlling the motor to generate the rotational power to wind up the seat belt with a desired winding force.

In the invention, the motor control unit controls the motor to generate the rotational power to wind up the seat belt with the desired winding force, so that an occupant can change tension of the seat belt through setting according to occupant preference, thereby making the occupant more comfortable while driving the vehicle.

BRIEF DESCRIPTION OF THE DRAWINGS

FIGS. 8(a) to 8(d) are views for explaining an operation of a switch gear in the seat belt retractor shown in FIG. 2, wherein FIG. 8(a) is a view showing an inoperative state of the switch gear viewed from an axial direction of the reel, FIG. 8(b) is a partial sectional view taken along line 8(b)-8(b) in FIG. 8(a), FIG. 8(c) is a view showing an operative state of the switch gear viewed from the axial direction of the reel, and FIG. 8(d) is a partial sectional view taken along line 8(d)-8(d) in FIG. 8(c);

DETAILED DESCRIPTION OF PREFERRED EMBODIMENTS

Hereunder, embodiments of the present invention will be described with reference to the accompanying drawings.

Figure 1:
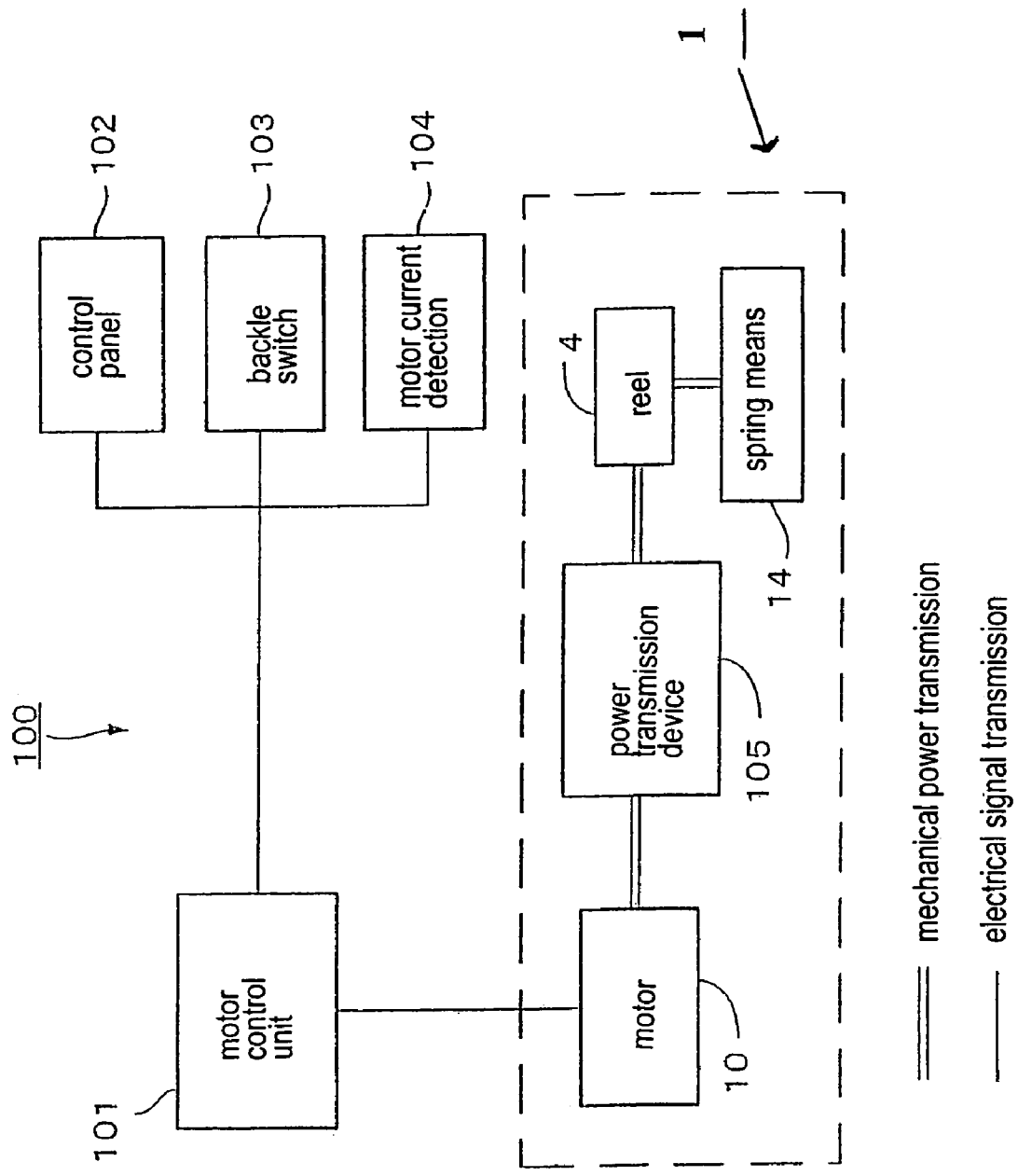
FIG. 1 is a schematic block diagram showing a structure of a seat belt apparatus according to a first embodiment of the present invention.
Figure 15:
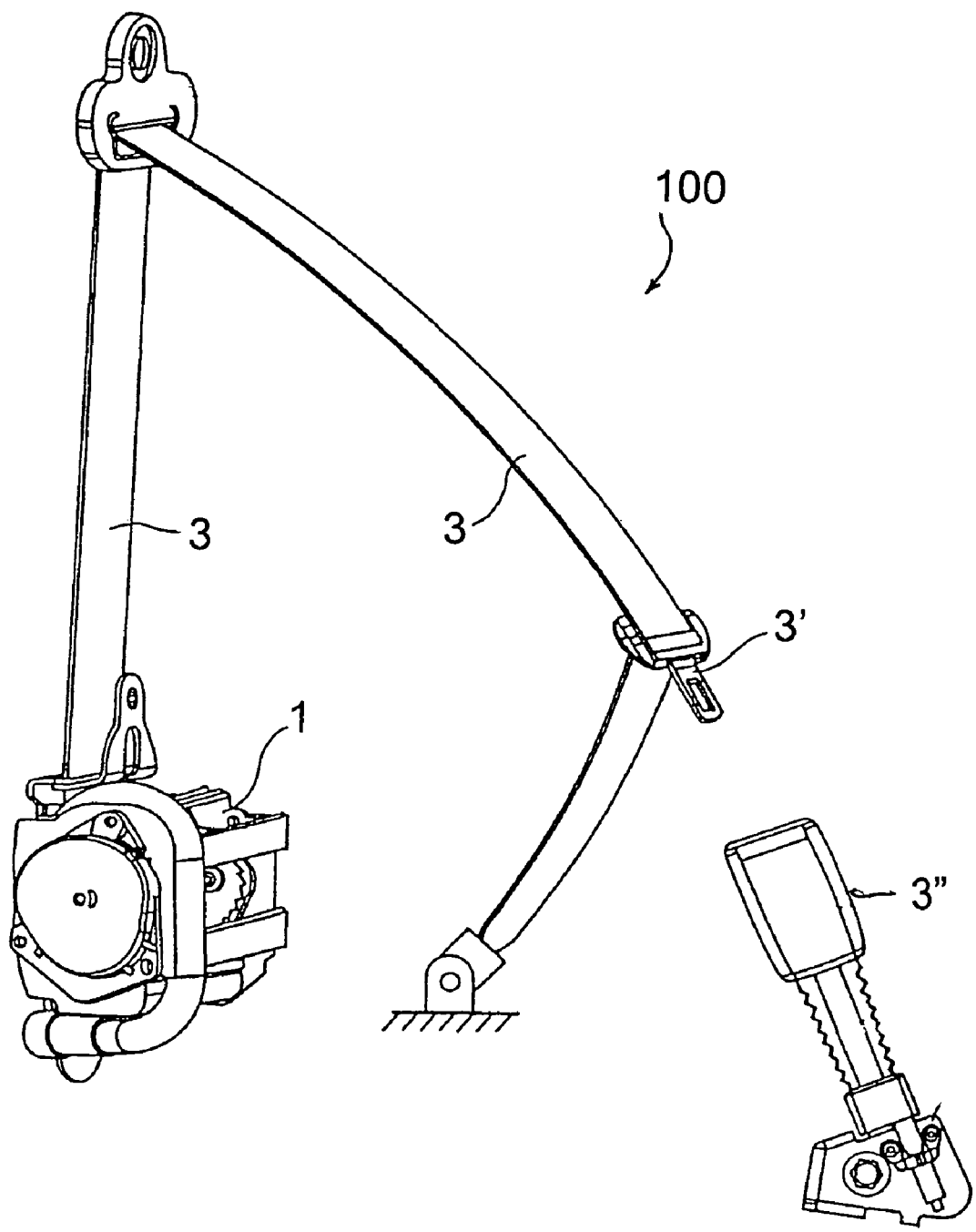
FIG. 15 is a view showing a seat belt apparatus having the seat belt retractor.

FIG. 1 is a schematic block diagram showing a structure of a seat belt apparatus according to a first embodiment of the present invention. As shown in FIG. 1, a seat belt apparatus 100 comprises a seat belt retractor 1; a motor control unit 101; a control panel 102; a buckle switch 103; and a motor current detector 104. The seat belt retractor 1 comprises a motor 10; a power transmission device 105; a reel 4; and a spring device 14. As shown in FIG. 15, the seat belt apparatus 100 also includes a seat belt 3; a tongue 3' attached to the seat belt; and a buckle 3" for engaging the tongue 3'. The seat belt 3 is withdrawn from the retractor 1 to extend on an occupant. In this state, the tongue 3' is latched with the buckle 3", whereby the seat belt apparatus 100 restrains the occupant to a vehicle seat.

The motor control unit 101 controls an operation of the motor 10 according to a signal input from the control panel 102, the buckle switch 103, and the motor current detector 104. The control panel 102 is mounted on or near the vehicle seat, and is provided with a plurality of switches for allowing the occupant to directly adjust tension of the seat belt (described later). The buckle switch 103 is mounted in the buckle for detecting whether the tongue is latched. The motor current detector 104 is connected to the motor 10 for detecting a current flowing through the motor 10.

In the seat belt retractor 1, the motor control unit 101 controls the motor 10 to rotate the reel 4 connected to the motor 10 via the power transmission device 105. The spring device 14 applies an urging force onto the reel 4. The rotational driving power from the motor 10 and the urging force from the spring device 14 cooperate together to adjust the tension of the seat belt wound onto the reel 4. Accordingly, it is possible to effectively and comfortably restraint and protect the occupant through easy adjustment of the belt tension. It is also possible to make the structure for adjusting the belt tension simple.

Figure 2:
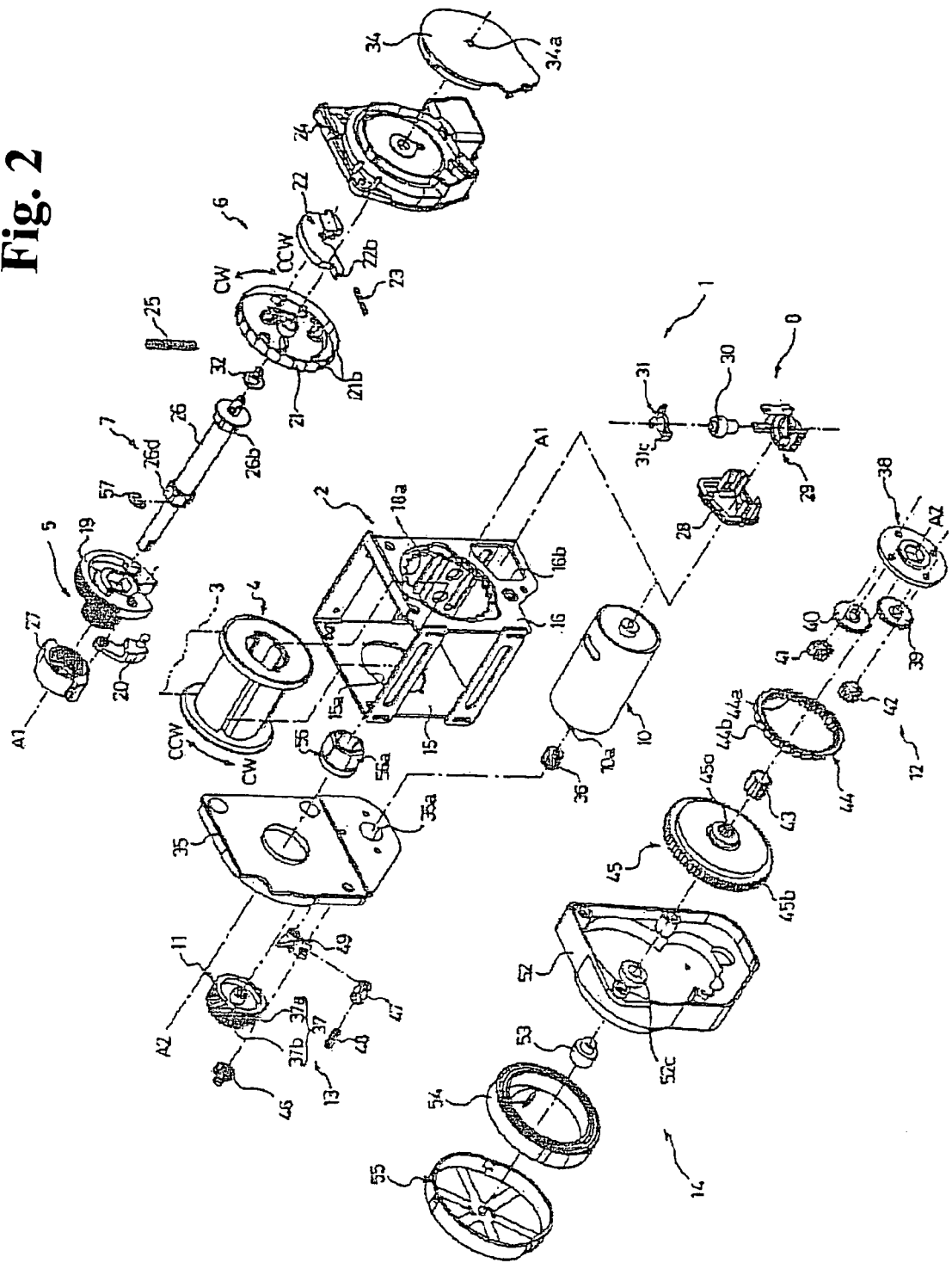
FIG. 2 is an exploded perspective view showing a seat belt retractor according to the first embodiment.
Figure 3:
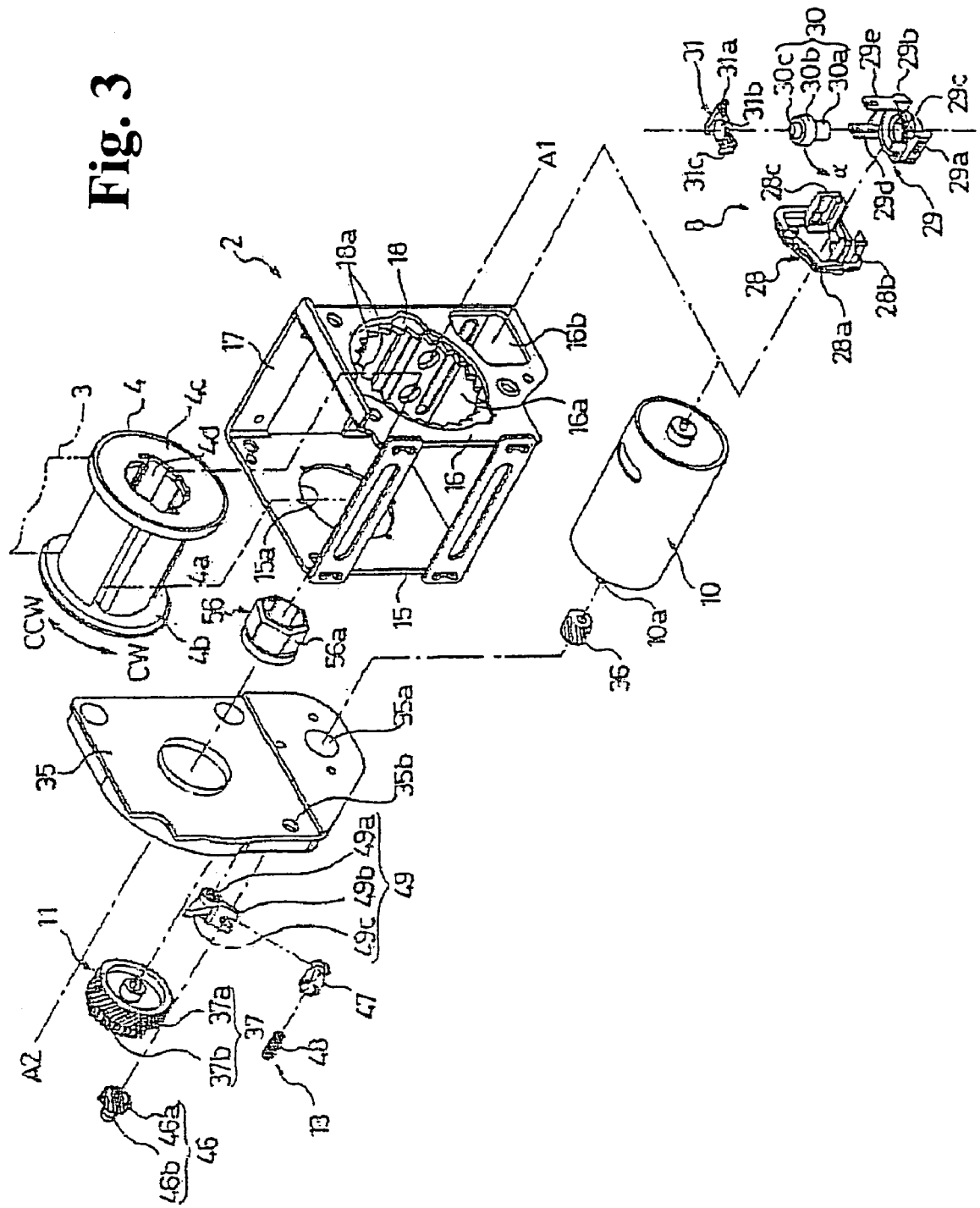
FIG. 3 is a partially enlarged exploded perspective view showing a part of the seat belt retractor shown in FIG. 2.
Figure 4:
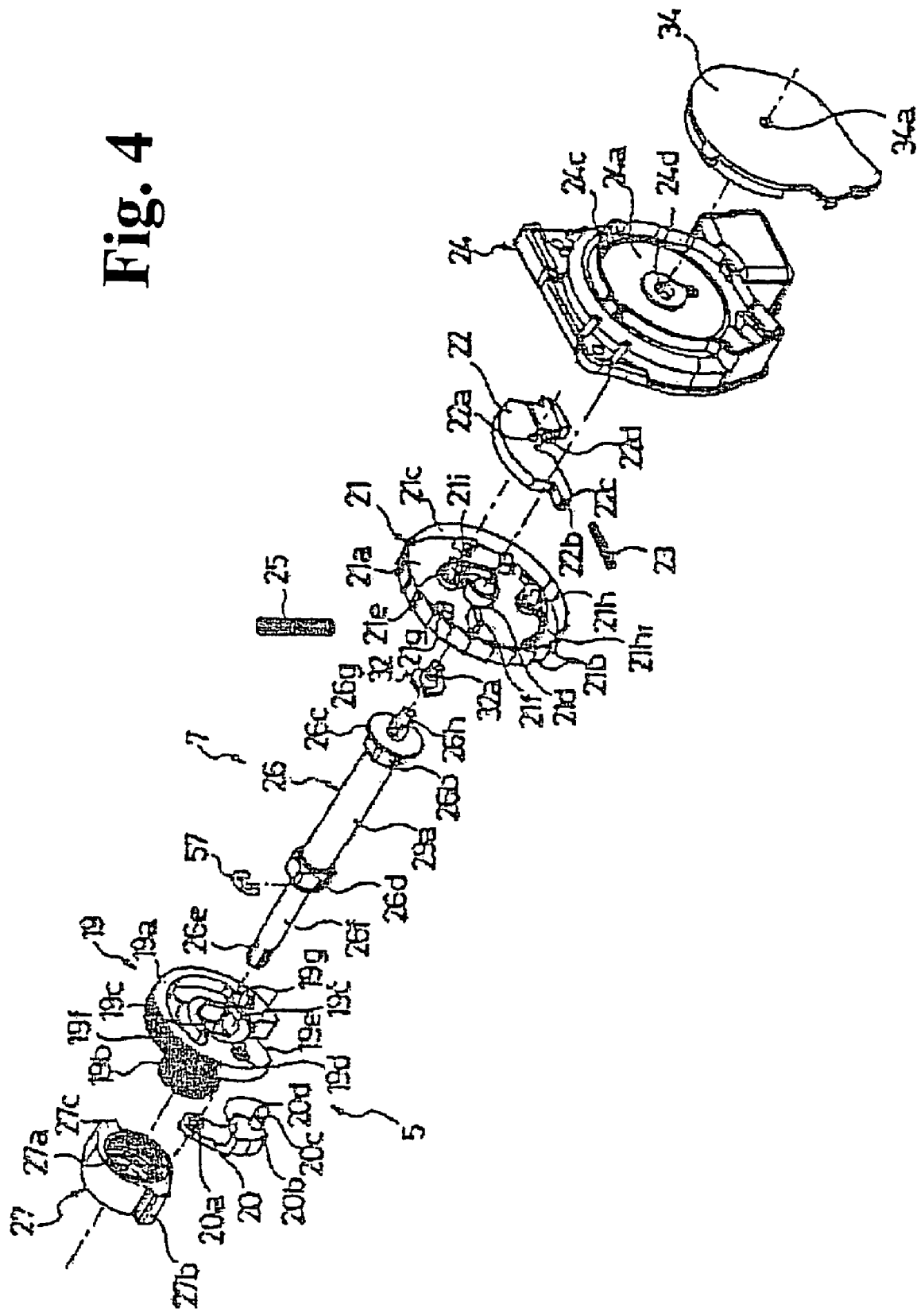
FIG. 4 is a partially enlarged exploded perspective view showing another part of the seat belt retractor shown in FIG. 2.
Figure 5:
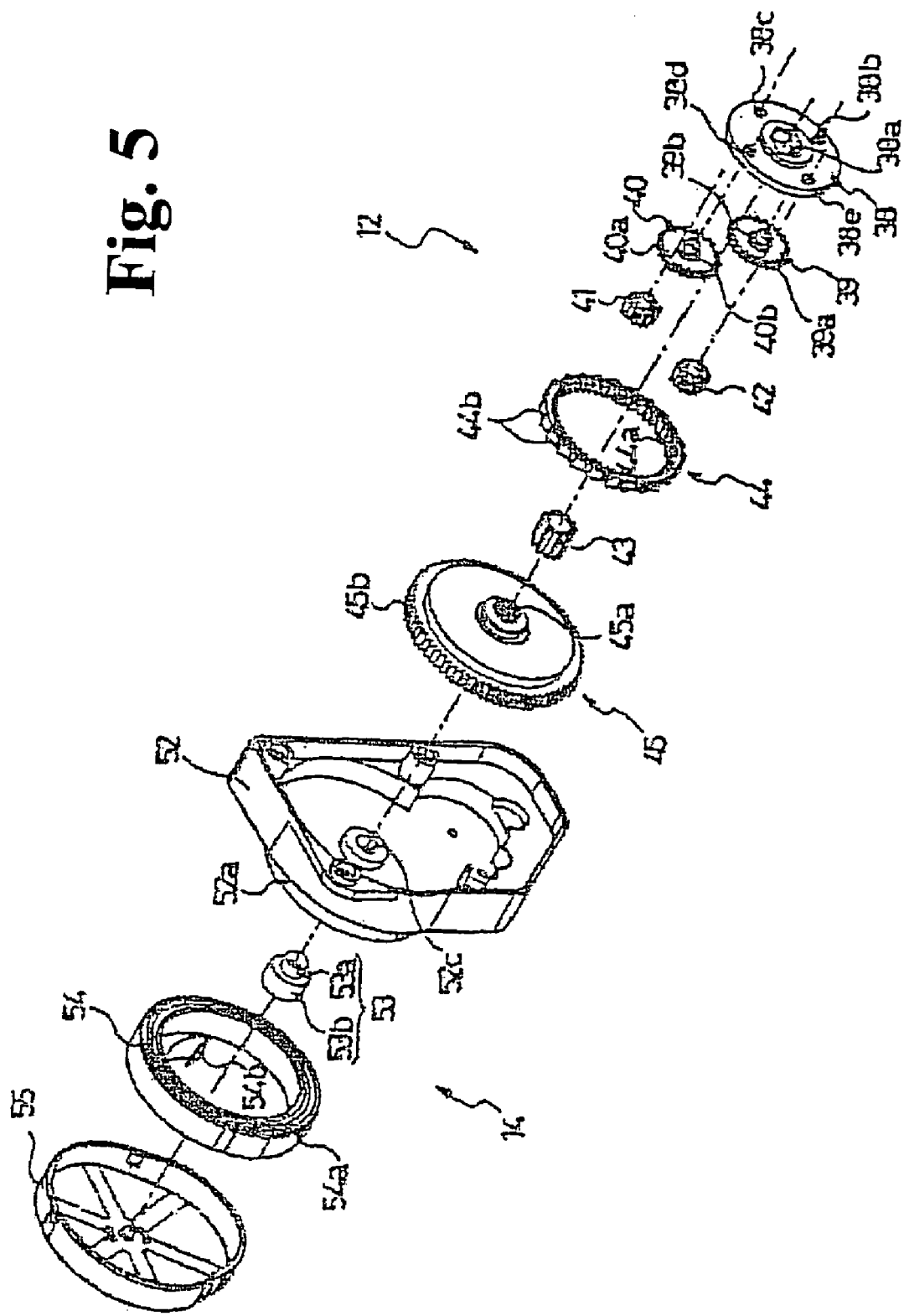
FIG. 5 is a partially enlarged exploded perspective view showing a further part of the seat belt retractor shown in FIG. 2.
Figure 6:
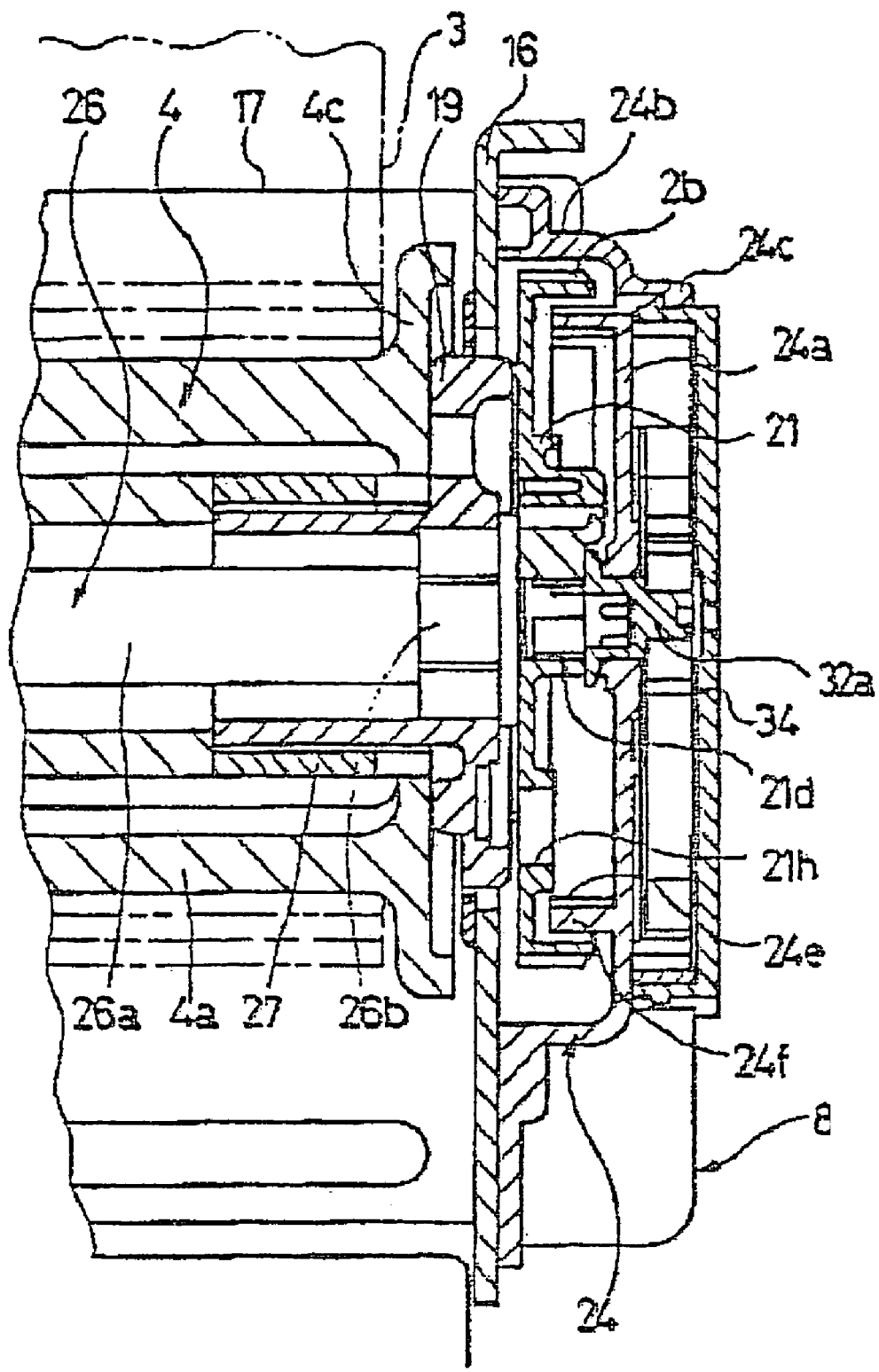
FIG. 6 is a vertical sectional view of the seat belt retractor shown in FIG. 2 on a side of a locking device in an assembled state.
Figure 7:
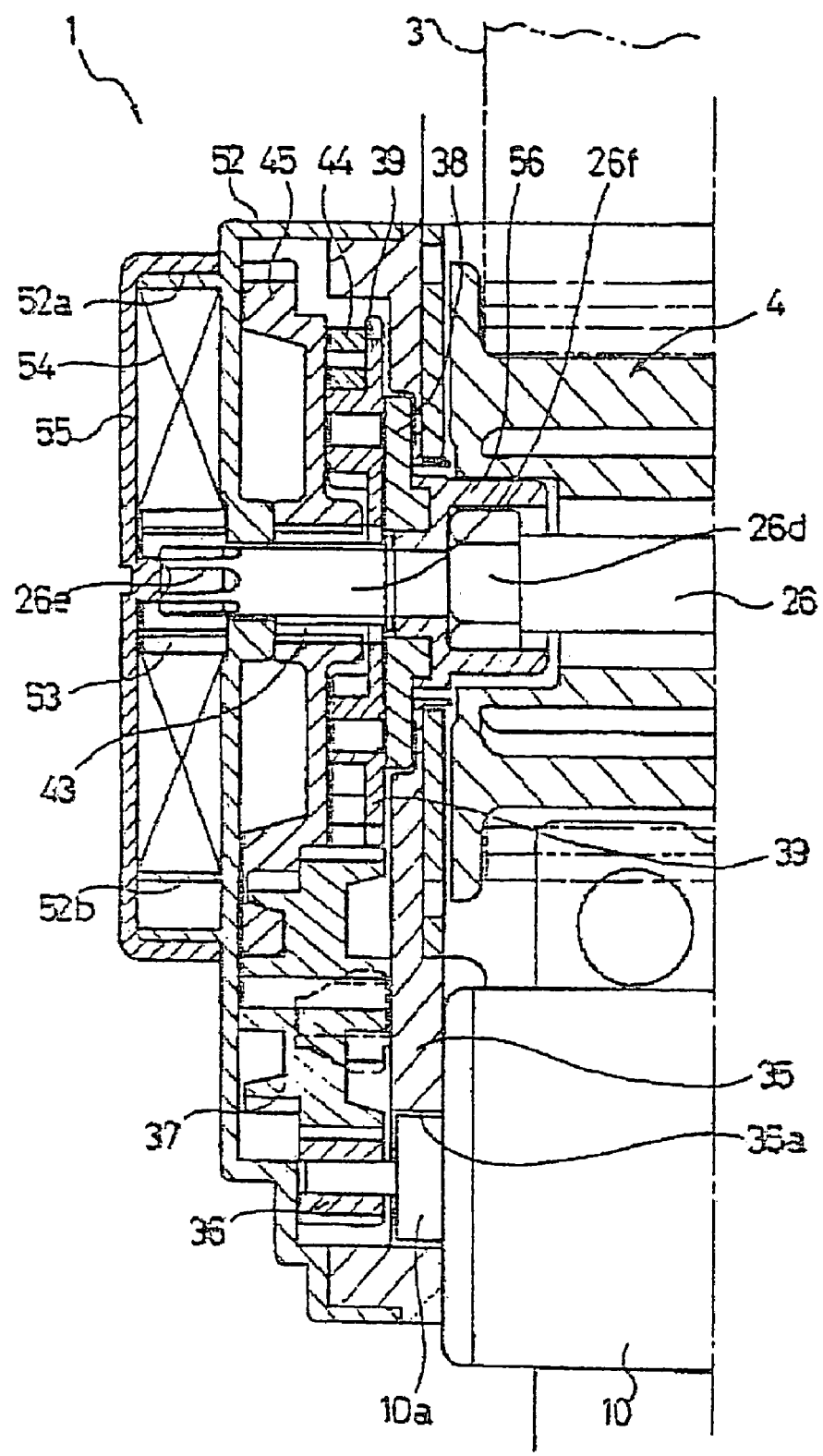
FIG. 7 is a vertical sectional view of the seat belt retractor shown in FIG. 2 on a side of a spring device in an assembled state.

Hereinafter, the structure and operation of the seat belt retractor will be described in detail. FIG. 2 is an exploded perspective view showing a seat belt retractor in the seat belt apparatus according to the first embodiment. FIGS. 3 through 5 are partially enlarged exploded perspective views showing parts of the seat belt retractor in FIG. 2. FIG. 6 is a vertical sectional view of a locking device side of the seat belt retractor in an assembled state. FIG. 7 is a vertical sectional view of a spring device side of the seat belt retractor in an assembled state.

As shown in FIG. 2, the seat belt retractor 1 generally comprises a frame 2, a reel 4 on which a seat belt 3 is wound up; a locking device 5 disposed on one side of the frame 2 for locking the reel 4 not to rotate in a belt withdrawing direction CW in an operation; a lock activating mechanism 6 for actuating the locking device 5 when necessary; a force limiter mechanism (EA mechanism) 7 for limiting a load on the seat belt when the locking device 5 stops the reel 4 withdrawing the seat belt due to large deceleration such as a vehicle collision; a deceleration detecting means 8 for detecting the deceleration of the vehicle; a motor 10 for generating rotational torque; a power transmission gear mechanism 11 for transmitting the rotational torque of the motor 10; a reduction gear mechanism 12 for reducing the rotational speed of the motor 10 transmitted by the power transmission gear mechanism 11 while transmitting the rotational torque to the reel 4; a transmission path switching mechanism 13 (clutch mechanism) for selectively switching between a mode allowing the transmission of the rotational torque of the motor 10 to the reel 4 and a mode halting the transmission of the rotation of the reel 4 to the motor 10; and a spring device 14 (spring) for urging the reel 4 in a winding-up direction CCW of the seat belt 3.

The power transmission gear mechanism 11, the reduction gear mechanism 12, and the transmission path switching mechanism 13 compose a power transmission device 105 (power transmission path).

As shown in FIG. 2, the seat belt retractor 1 is exploded and arranged in three rows. An end A1 of a line A1-A2 extending through the frame 2 is connected to an end A1 of a line passing through the respective centers of the locking device 5 and the lock activating mechanism 6. An end A2 of the line A1-A2 is connected to an end A2 of a line passing through the respective centers of the reduction gear mechanism 12 and the spring device 14.

As shown in FIG. 3, the frame 2 comprises a pair of parallel sidewalls 15 and 16, and a back plate 17 connecting the sidewalls 15 and 16. A reel 4 is disposed between the sidewalls 15 and 16 of the frame 2 for winding up the seat belt 3.

One sidewall 15 is provided with a circular large opening 15a formed therein and the other sidewall 16 is also provided with a circular large opening 16a formed therein coaxially with the large opening 15a. On the inside of the sidewall 16, an internal teeth member 18 having a circular large opening provided in an inner periphery thereof with a predetermined number of ratchet-like internal teeth 18a is fixed such that the internal teeth 18a are coaxial with the large opening 16a. The sidewall 16 is also provided with a mounting opening 16b to which the deceleration detecting means 8 is mounted.

The reel 4 comprises a seat belt take-up portion 4a on which the seat belt 3 is wound and flange portions 4b and 4c on the both ends of the seat belt take-up portion 4a. The reel 4 has a through hole 4d axially penetrating the center thereof. In this case, the through hole 4d has a hexagonal section at an end thereof on the sidewall 15 side, and a section at an end thereof on the sidewall 16 side for engaging a stopper 27 (described later), so that the reel 4 and the stopper 27 rotate together.

As shown in FIG. 4, the locking device 5 comprises a locking base 19 and a pawl 20. The locking base 19 comprises a disk portion 19a and a threaded shaft portion 19b. The locking base 19 is also provided with a through hole 19c axially penetrating the center thereof. The through hole 19c has a hexagonal hole 19c' at a portion corresponding to the disk portion 19a. The disk portion 19a is also provided with a hole 19d for rotatably supporting the pawl 20 and an arc load receiving portion 19e coaxially with the hole 19d. The load receiving portion 19e receives load from the pawl 20. The disk portion 19a is also provided with jagged teeth 19f formed in the outer periphery thereof in a predetermined range at an opposite side of the load receiving portion 19e. The jagged teeth 19f can mesh with the internal teeth 18a of the internal teeth member 18. The disk portion 19a further has a spring supporting portion 19g for supporting one end of a pawl spring 25 (described later).

The pawl 20 has a hole 20a formed in a proximal end thereof. When a fixture such as a pin (not shown) is fitted into the hole 20a and the hole 19d of the locking base 19, the pawl 20 is pivotally attached to the locking base 19. The pawl 20 has a locking claw 20b at the tip end for engaging the internal teeth 18a of the internal teeth member 18 and a cam follower 20c comprising a projection pin. Further, the pawl 20 is provided with an arc-shaped load transmitting portion 20d. When the locking claw 20b is engaged with one of the internal teeth 18a, the load transmitting portion 20d transmits reaction force acting on the pawl 20 to the load receiving portion 19e of the locking base 19. That is, the reaction force of the pawl 20 is supported by the locking base 19.

The lock activating mechanism 6 comprises a lock gear 21; a flywheel 22; a flywheel spring 23 disposed between the lock gear 21 and the flywheel 22 in a compressed state; a first retainer 24 detachably fixed to the sidewall 16 of the frame 2; and a pawl spring 25 disposed between the locking base 19 and the lock gear 21 in a compressed state.

The lock gear 21 comprises a disk portion 21a and an annular toothed member 21c formed on the outer periphery of the disk portion 21a, and has a plurality of ratchet-like external teeth 21b formed on the outer periphery thereof.

The disk portion 21a is provided with a cylindrical boss 21d at the center thereof and a supporting pin 21e disposed near the boss 21d to pivotally support the flywheel 22. Further, the disk portion 21a is provided near the outer periphery thereof with first and second stoppers 21f and 21g for limiting the pivotal movement of the flywheel 22 within a predetermined range and with a cam slot 21h penetrating the disk portion 21a. The cam follower 20c of the pawl 20 is inserted in the cam slot 21h. Therefore, when lock gear 21 rotates relative to the locking base 19, the cam follower 20c is guided by the cam slot 21h, so that the pawl 20 pivots. Further, the disk portion 21a is provided with a spring supporting portion 21i for supporting one end of the pawl spring 25.

The flywheel 22 is provided with a supporting hole 22a for pivotally fitting into the supporting pin 21e of the lock gear 21 and an locking portion 22c having an locking claw 22b at the end thereof. When the flywheel 22 is supported pivotally about the supporting hole 22a, the locking portion 22c is positioned between the first and second stoppers 21f and 21g. Therefore, the pivotal movement of the flywheel 22 is limited between the first and second stoppers 21f and 21g. When the locking portion 22c contacts the first stopper 21f, the locking claw 22b is retracted radially and inwardly. When the locking portion 22c contacts the second stopper 21g, the locking claw 22b projects radially and outwardly. The flywheel 22 is provided with a spring supporting portion 22d for supporting one end of the flywheel spring 23.

The one end of the flywheel spring 23 is supported by the spring supporting portion 22d of the flywheel 22, and the other end of the flywheel spring 23 is supported by a spring supporting portion (not shown) of the lock gear 21, so that the flywheel spring 23 always urges the flywheel 22 relative to the lock gear 21 in the belt withdrawing direction CW. Therefore, the locking portion 22c contacts the first stopper 21f when the flywheel 22 is not in operation.

The first retainer 24 comprises a disk portion 24a; a first annular flange portion 24b (shown in FIG. 6) formed on the outer periphery of the disk portion 24a to project toward the frame 2 detachably fixed to the sidewall 16; and a second annular flange portion 24c formed on the outer periphery of the disk portion 24a to project on a side opposite to the flame 2 side.

The disk portion 24a is provided with a through hole 24d at the center thereof. As shown in FIG. 6, the disk portion 24a is provided with an annular teeth member 24f projecting from a surface thereof on the frame 2 side, so that the annular teeth member 24f is coaxial with the through hole 24d. The annular teeth member 24f has ratchet-like inner teeth 24e. The annular teeth member 24f is designed to have such a size that the annular teeth member 24f can be inserted between the annular toothed member 21c of the lock gear 21 and the first and second stoppers 21f and 21g in a state that the retractor 1 is assembled. In this case, the locking claw 22b of the flywheel 22 is positioned inside the annular toothed member 21c. When the flywheel 22 pivots relative to the lock gear 21 so that the locking portion 22c contacts the second stopper 21g, the locking claw 22b is engaged with one of the internal teeth 24e. A first cover 34 is detachably attached to the second annular flange portion 24c.

On end of the pawl spring 25 is supported by the spring supporting portion 21i of the lock gear 21, and the other end of the pawl spring 25 is supported by the spring supporting portion 19g of the locking base 19. The pawl spring 25 always urges the lock gear 21 in the belt withdrawing direction CW relative to the locking base 19. Therefore, when the lock gear 21 is inoperative, the cam follower 20c of the pawl 20 is positioned at the most inner position 21h1 of the cam slot 21h. In this state, further rotation of the lock gear 21 by the pawl spring 25 is blocked.

The EA mechanism 7 comprises a torsion bar 26 and the stopper 27 for engaging the threaded shaft portion 19b of the locking base 19. The torsion bar 26 comprises a torsion bar portion 26a; a first torque transmission portion 26b formed on one end at the lock gear 21 side of the torsion bar portion 26a and having a hexagonal section, so that the first torque transmission portion 26b is fitted into the hexagonal hole 19c' of the locking base 19 to stop the relative rotation between the first torque transmission portion 26b and the locking base 19; a flange portion 26c formed on the end of the first torque transmission portion 26b; a second torque transmission portion 26d formed on the other end of the torsion bar portion 26a and having a hexagonal section; a first shaft portion 26f coaxially projecting from the second torque transmission portion 26d and having spline grooves 26e formed in a tip end thereof; and a second shaft portion 26h coaxially projecting from the flange portion 26c and having spline grooves 26g formed therein.

The cylindrical stopper 27 has an internal thread 27a formed in the inner periphery thereof, so that the internal thread 27a engages the threaded shaft portion 19b of the locking base 19. The cylindrical stopper 27 has a pair of rotational torque transmission portions 27b and 27c formed on the outer periphery for receiving the rotational torque of the reel 4. With the rotational torque transmission portions 27b and 27c, the stopper 27 rotates together with the reel 4. In addition, the stopper 27 can move relative to the reel 4 in the axial direction. Therefore, a rotational difference is cased so that the stopper 27 rotates in the belt withdrawing direction CW relative to the locking base 19. That is, the reel 4 rotates in the belt withdrawing direction CW relative to the locking base 19, and the stopper 27 moves in the axial direction so as to contact the disk portion 19a of the locking base 19. As the stopper 27 contacts the disk portion 19a, the axial movement of the stopper 27 is blocked and the stopper 27 then rotates together with the locking base 19.

Therefore, when there is a rotational difference between the stopper 27 and the locking base 19, the torsion bar portion 26a is twisted. Thus, the EA mechanism 7 exhibits EA function for limiting the belt load at a vehicle collision. When the stopper 27 contacts the locking base 19, the EA function is finished. As mentioned above, the range of the EA function is defined by the stopper 27, the internal thread 27a, the locking base 19, and the threaded shaft portion 19b.

As shown in FIG. 3, the deceleration detecting means 8 comprises a housing 28 to be attached to the sidewall 16; a sensor casing 29 attached to the housing 28; an inertia mass 30 mounted on the sensor casing 29; and an actuator 31 to be actuated by the inertia mass 30.

The housing 28 comprises a fitting portion 28a to be fitted in a mounting hole 16b of the sidewall 16 of the frame 2 and a pair of supporting arms 28b and 28c supporting the sensor casing 29. The sensor casing 29 comprises a pair of supported portions 29a and 29b fitted in grooves of the supporting arms 28b and 28c, so that the supported portions 29a and 29b are supported by the supporting arms 28b and 28c, a mass receiving portion 29c on which the inertia mass 30 is mounted, and a pair of supporting arms 29d and 29e pivotally supporting the actuator 31.

The inertia mass 30 comprises a leg portion 30a; a mass portion 30b above the leg portion 30a; and an actuating portion 30c actuating the actuator 31. The inertia mass 30 is mounted on the mass receiving portion 29c. Normally, the inertia mass 30 stands straight as illustrated. When deceleration exceeding a predetermined value acts on the vehicle, the inertia mass 30 tilts in a direction α, so that the actuating portion 30c makes the actuator 31 to pivot.

The actuator 31 comprises a pivot shaft portion 31a pivotally fitted in and supported by holes formed in the supporting arms 29d and 29e of the sensor casing 29; a pressed portion 31b pressed by the actuating portion 30c of the inertia mass 30; and a locking claw 31c formed at a side opposite to the pivot shaft portion 31a for engaging the external teeth 21b of the lock gear 21. When the inertia mass 30 stands straight, the actuator 31 is in its lowest position, i.e. a non-engaging position where the locking claw 31c is not engaged with any of the external teeth 21b. When the inertia mass 30 tilts in the direction α, the actuator 31 pivots upwardly to an engaging position where the locking claw 31c is engaged with one of the external teeth 21b.

As shown in FIG. 3, the motor 10 is attached to a second retainer 35 attached to the left sidewall 15 of the frame 2. The second retainer 35 is provided with a through hole 35a through which a rotational shaft 10a of the motor 10 is inserted. The driving of the motor 10 is controlled by the motor control unit according to various information of the vehicle including information about the running condition of the vehicle such as running speed and acceleration, information about the operational condition of the vehicle such as pedaling speed of a brake pedal and pedaling speed of a throttle pedal.

The power transmission gear mechanism 11 comprises a motor gear 36 composed of a helical gear fixed to the rotational shaft 10a of the motor 10, so that the motor gear 36 can rotate together with the rotational shaft 10a; and a connecting gear 37. The connecting gear 37 comprises a large-diameter connecting gear 37a composed of a helical gear always meshing with the motor gear 36, and a small-diameter connecting gear 37b formed coaxially and integrally with the large-diameter connecting gear 37a and having a diameter smaller than that of the large-diameter connecting gear 37a.

As shown in FIG. 2 and FIG. 5, the reduction gear mechanism 12 comprises a first carrier 38 composed of a circular annular disk; two planetary gears 39 and 40; two idle gears 41 and 42; a sun gear 43; a ring-like internal gear 44; and a reduction gear 45. The first carrier 38 is provided with a hexagonal through hole 38a formed at its center and four supporting holes 38b, 38c, 38d, and 38e formed at equal intervals in the circumferential direction.

The planetary gears 39 and 40 comprise large planetary gears 39a and 40a and small planetary gears 39b and 40b having diameters smaller than those of the large planetary gears 39a and 40a, respectively. The large planetary gears 39a and 40a are formed integrally and coaxially with the small planetary gears 39b and 40b, respectively. The small planetary gears 39b and 40b are formed to have the same size as that of the idle gears 41 and 42. The planetary gears 39 and 40 are supported by two supporting holes 38b and 38d formed in the first carrier 38 at opposed positions, respectively, so as to allow the relative rotation. The small planetary gears 39b and 40b are not clearly shown in FIG. 2.

The idle gears 41 and 42 are supported by the other two supporting holes 38c and 38e formed in the first carrier 38 at opposed positions, respectively, so as to allow the relative rotation. The sun gear 43 is supported by the first shaft portion 26f of the torsion bar 26 so as to allow the relative rotation. The internal gear 44 has internal teeth 44a on the inner periphery thereof and ratchet teeth 44b on the outer periphery thereof. The reduction gear 45 has internal teeth 45a on the inner periphery thereof and external teeth 45b on the outer periphery thereof.

Both the large planetary gears 39a and 40a of the two planetary gears 39 and 40 always mesh with the sun gear 43, and both the small planetary gears 39b and 40b always mesh with the internal teeth 44a of the internal gear 44. Both the two idle gears 41 and 42 always mesh with the internal teeth 44a of the internal gear 44. Further, the internal teeth 45a of the reduction gear 45 always mesh with the sun gear 43, and the external teeth 45b of the reduction gear 45 always mesh with the small-diameter connecting gear 37b of the connecting gear 37.

As shown in FIG. 2 and FIG. 3, the transmission path switching mechanism 13 comprises a switch gear 46; a plunger 47; a spring 48; and a locking lever 49. As shown in FIGS. 8(a) through 8(d), the switch gear 46 is supported by a supporting shaft 50 fixed to a mounting hole 35b of the second retainer 35 such that the switch gear 46 is rotatable and movable in the axial direction for a predetermined distance. The switch gear 46 comprises a gear portion 46a composed of a helical gear and a slant face 46b of a circular truncated cone. The plunger 47 is slidably arranged in a cylinder housing 51 attached to the second retainer 35. In this case, an axial projection 47a of the plunger 47 is slidably fitted in a guide groove 51a formed in the cylinder housing 51 in the longitudinal direction, thereby preventing the plunger 47 from rotating about the longitudinal axis thereof.

The plunger 47 is provided at its end with a contact portion 47c having a slant face 47b with the same inclination as that of the slant face 46b of the circular truncated cone. The spring 48 is disposed and compressed between the plunger 47 and the cylinder housing 51. The plunger 47 is always biased toward the switch gear 46 by the urging force of the spring 48, so that the contact portion 47c always contacts the switch gear 46. In this case, when the motor 10 is not driven, the switch gear 46 is set at its right-most position as shown in FIG. 8(b)

where the plunger 47 projects maximum. That is, the surface of the slant face 47b of the contact portion 47c contacts the surface of the slant face 46b of the switch gear 46. The slant face 46b and the slant face 47b compose a cam mechanism for moving the plunger 47 according to the movement of the switch gear 46 in the axial direction.

When the motor 10 is driven, the switch gear 46 is moved leftward and is thus set at its left-most position as shown in FIG. 8(d) where the plunger 47 retracts maximum. That is, the tip end of the contact portion 47c contacts the outer periphery of the gear portion 46a of the switch gear 46. In this state, the tip end of the contact portion 47c is prevented from engaging teeth of the gear portion 46a of the switch gear 46. Actions of the switch gear 46 and the plunger 47 shown in FIG. 8(b) to FIG. 8(d) will be described later.

Figure 9:
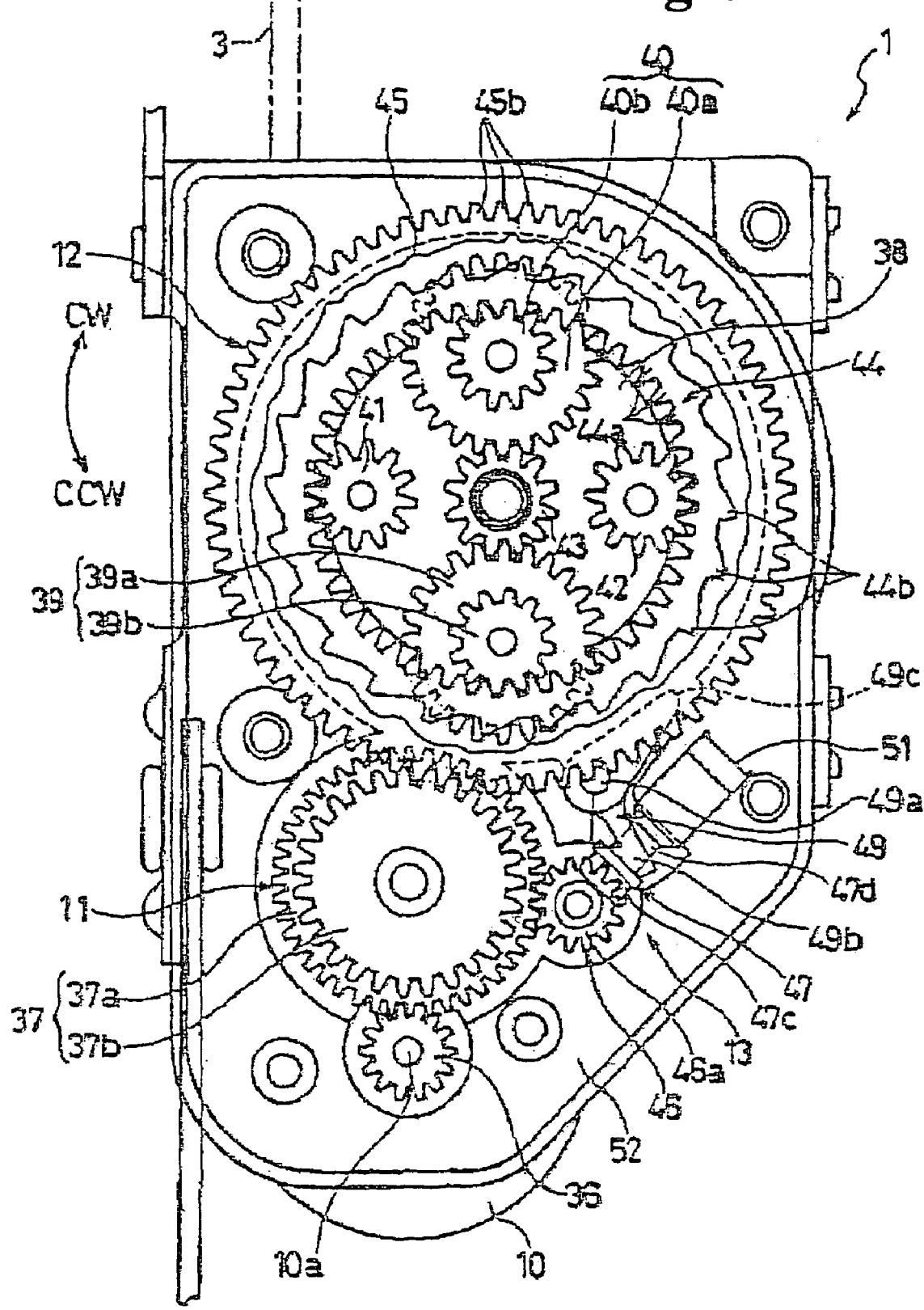
FIG. 9 is a partially cut side view showing a motor, a power transmission gear mechanism, a reduction gear mechanism, and a transmission path switching mechanism in the seat belt retractor shown in FIG. 2 in the inoperative state.
Figure 10:
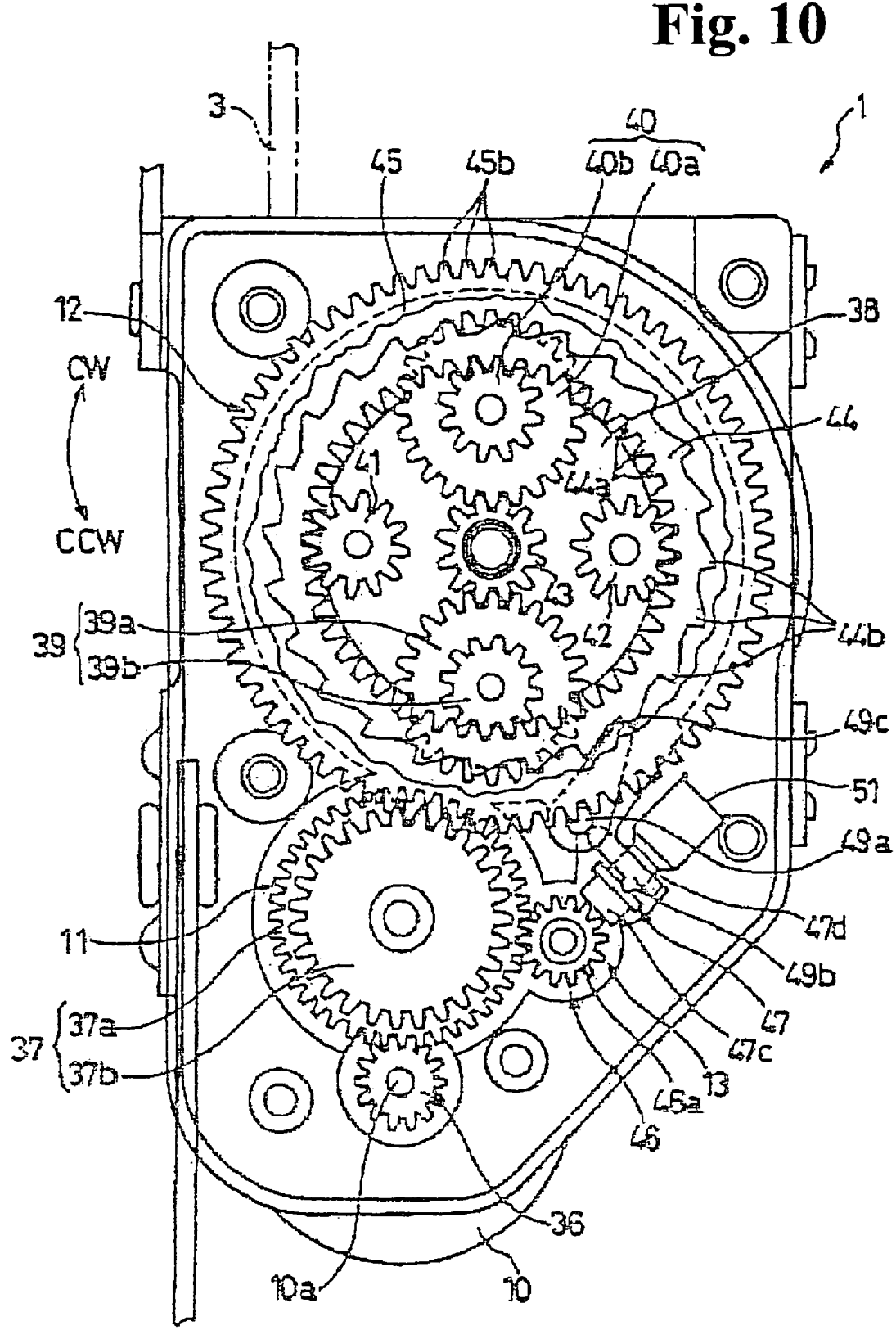
FIG. 10 is a partially cut side view showing the motor, the power transmission gear mechanism, the reduction gear mechanism, and the transmission path switching mechanism used in the seat belt retractor shown in FIG. 2 in the operative state.

The plunger 47 further comprises a locking lever actuating portion 47d. The locking lever 49 comprises a pivot shaft 49a; a forked operation lever portion 49b; and a locking claw 49c. The pivot shaft 49a is pivotally supported to the second retainer 35. A forked portion of the operation lever portion 49b is engaged with the locking lever actuating portion 47d of the plunger 47, so that the locking lever 49 can pivot about the pivot shaft 49a according to the movement of the plunger 47. The locking claw 49c can be engaged with and disengaged from the ratchet teeth 44b of the internal gear 44. When the plunger 47 is in the state as shown in FIG. 8(b), the locking claw 49c is set in a position where the locking claw 49c is not engaged with any one of ratchet teeth 44b of the internal gear 44 as shown in FIG. 9. When the plunger 47 is in the state as shown in FIG. 8(d), the locking claw 49c is set in a position where the locking claw 49c can be engaged with one of the ratchet teeth 44b as shown in FIG. 10.

With the transmission path switching mechanism 13 having the aforementioned structure, the power transmission path between the reel 4 and the motor 10 composed of the power transmission gear mechanism 11 and the reduction gear mechanism 12 is set in OFF mode when the motor 10 is not driven, so that the reel 4 and the motor 10 are independent from each other to rotate freely. The power transmission path is set in ON mode when the motor 10 is driven, so that the reel 4 and the motor 10 are connected to each other to rotate together.

As shown in FIG. 2 and FIG. 5, the spring device 14 comprises a second cover 52; a bush 53; a return spring 54; and a spring cover 55. The second cover 52 is attached to the second retainer 35 to cover the power transmission gear mechanism 11, the reduction gear mechanism 12, and the transmission path switching mechanism 13. The second cover 52 is also provided with an annular projection 52a on a side opposite to the reduction gear mechanism 12. The return spring 54 is accommodated in the annular projection 52a. The second cover 52 is also provided with a spring attachment portion 52b inside the annular projection 52a. Further, the second cover 52 has a supporting hole 52c formed therein for rotatably supporting the first shaft 26f of the torsion bar 26 via a bush 53.

The bush 53 is provided with a shaft receiving portion 53a and a spring attachment portion 53b. The bush 53 is fitted onto the end of the torsion bar 26 while engaging the spline grooves 26e, so that the bush 53 can rotate together with the torsion bar 26. The shaft receiving portion 53a of the bush 53 is rotatably supported by the supporting hole 52c of the second cover 52 and supports the first shaft portion 26f of the torsion bar 26.

The return spring 54 is composed of a spiral spring. An outer peripheral end 54a of the return spring 54 is connected to the spring attachment portion 52b of the second cover 52, and an inner peripheral end 54b of the return spring 54 is connected to the spring attachment portion 53b of the bush 53. The reel 4 is always biased in the belt winding direction CCW by the urging force of the return spring 54 via the bush 53 and the torsion bar 26.

As shown in FIG. 3 and FIG. 7, the second carrier 56 comprises a cylindrical first shaft portion 56a having a hexagonal section and a cylindrical second shaft portion 56b (shown only in FIG. 7) having an outer diameter slightly smaller than that of the first shaft portion 56a and disposed coaxially with the first shaft portion 56a. An outer profile of the second shaft portion 56b has a hexagonal section and an inside hole of the second shaft portion 56b has a circular section.

At the sidewall 15 side, an end portion of the through hole 4d of the reel 4 is fitted to the outer periphery of the first shaft portion 56a not to allow the relative rotation, and the second torque transmission portion 26d of the torsion bar 26 is fitted to the inner periphery of the first shaft portion 56a not to allow the relative rotation. Therefore, the reel 4, the second carrier 56, and the second torque transmission portion 26d of the torsion bar 26 rotate together. The through hole 38a of the first carrier 38 is fitted to the outer periphery of the second shaft portion 56b not to allow the relative rotation, and the first shaft portion 26f of the torsion bar 26 is fitted to the inner periphery of the second shaft portion 56b. Therefore, the first and second carriers 38 and 56 rotate together.

The second carrier 56 is secured between the first shaft portion 26f and the second torque transmission portion 26d in the axial direction by an E ring 57 attached to the first shaft portion 26f of the torsion bar 26. Thus, the motor 10, the power transmission gear mechanism 11, the reduction gear mechanism 12, the transmission path switching mechanism 13, and the motor control unit compose together a belt tension control mechanism for controlling belt tension on the seat belt 3.

Hereinafter, an action of the belt tension control mechanism having the structure described above will be explained.

(1) Inoperative State of the Seat Belt Retractor (Seat Belt Housed State)

In the inoperative state of the seat belt retractor 1, the seat belt 3 is wound up onto the reel 4 by the spring device 14. The motor 10 is also inoperative. In the inoperative state, the motor gear 36, the connecting gear 37, the switch gear 46 do not rotate as shown in FIG. 9, and the switch gear 46 is set in the position shown in FIGS. 8(a) and 8(b). Accordingly, the plunger 47 projects maximum and the surface of the slant face 47b of the contact portion 47c contacts the surface of the slant face 46b of the switch gear 46. In this state, the locking lever 49 is set in the position where the locking claw 49c is not engaged with any of the ratchet teeth 44b of the internal gear 44. That is, the power transmission path is set in the OFF mode. Therefore, the internal gear 44 is free to rotate in either direction of the belt withdrawing direction CW and the belt winding direction CCW. That is, the belt tension control mechanism is in the inoperative state.

(2) Seat Belt Withdrawing Action

When the seat belt 3 is withdrawn from the inoperative state of the seat belt retractor 1, the reel 4 rotates in the belt withdrawing direction CW. Then, the second torque transmission portion 26d of the torsion bar 26 and the second carrier 56 rotate together in the belt withdrawing direction CW in FIG. 7. Accordingly, the first carrier 38 rotates in the same direction CW, so that the respective planetary gears 39 and 40 try to move in the same direction CW around the sun gear 43. Therefore, the large planetary gears 39a and 40a of the respective planetary gears 39 and 40 try to rotate in the belt withdrawing direction CW so as to try to rotate the sun gear 43 in the belt winding direction CCW.

The small planetary gears 39b and 40b try to rotate in the belt winding direction CCW so as to try to rotate the internal gear 44 in the belt withdrawing direction CW. At this time, the small-diameter connecting gear 37b of the connecting gear 37 always meshes with the reduction gear 45, the reduction gear 45 always meshes with the sun gear 43, and the motor gear 36 and the switch gear 46 always mesh with the large-diameter connecting gear 37a integrally formed with the small-diameter connecting gear 37b. Accordingly, the sun gear 43 is biased by a predetermined rotational resistance. On the other hand, the internal gear 44 is free to rotate as mentioned above. Accordingly, the internal gear 44 freely rotates while the sun gear 43 does not rotate. In this state, the small-diameter planetary gears 39b and 40b and the large-diameter planetary gears 39a and 40a rotate in the belt withdrawing direction CW.

Since the sun gear 43 does not rotate, the rotation of the reel 4 in the belt withdrawing direction CW during the seat belt 3 is withdrawn is not transmitted to the switch gear 46, so that the transmission path switching mechanism 13 is not actuated so as to maintain the power transmission path between the reel 4 and the motor 10 in the OFF mode. Therefore, the rotation of the reel 4 is not transmitted to the motor 10, so that the motor 10 is not affected by the rotation of the reel 4. Since the motor 10 is not driven at this time, the belt tension control mechanism is maintained in its inoperative state.

It should be noted that, during the belt withdrawal, the return spring 54 of the spring device 14 is gradually tightened according to the rotation of the second torque transmitting portion 26d, so that the spring force is gradually increased according to the belt withdrawn amount.

(3) Winding Action of the Seat Belt by Motor Torque

When the motor 10 is driven so as to rotate the reel 4, in the belt winding direction CCW, the motor gear 36 rotates in the belt winding direction CCW in FIG. 9, so that the connecting gear 37 rotates in the belt withdrawing direction CW with reducing the rotational speed. Then, the reduction gear 45 rotates in the belt winding direction CCW with further reducing the rotational speed, so that the sun gear 43 also rotates at the same speed and in the same direction CCW as the reduction gear 45. By the rotation of the sun gear 43, the planetary gears 39 and 40 rotate about their respective axes in the belt withdrawing direction CW with further reducing the rotational speed, so that the internal gear 44 rotates in the same direction CW. At this time, since the internal gear 44 rotates, the respective planetary gears 39 and 40 do not move around the sun gear 43.

At the same time, the switch gear 46 also rotates in the belt winding direction CCW by the rotation of the connecting gear 37. Since the large-diameter connecting gear 37a of the connecting gear 37 and the switch gear 46 mesh with each other through helical gears, thrust acts on the switch gear 46 in the axial direction. By the thrust, the switch gear 46 moves in the axial direction and is thus set to the left-most position shown in FIG. 8(d). According to the movement of the switch gear 46 in the axial direction, the slant face 47b of the contact portion 47c of the plunger 47 slides along the slant face 46b of the switch gear 46, so that the plunger 47 moves in a direction apart from the switch gear 46 and is thus retracted into the cylinder housing 51.

Finally, the switch gear 46 is supported in the thrust direction by the second retainer 35, so that the axial movement of the switch gear 46 is stopped and the switch gear 46 is set in the left-most position shown in FIG. 8(d). In this sate, the plunger 47 is retracted maximum in the cylinder housing 51, and the tip end of the contact portion 47c contacts the outer periphery of the gear portion 46a of the switch gear 46. Since the locking lever actuating portion 47d presses the operation lever portion 49b of the locking lever 49 as shown in FIG. 10 according to the retraction of the plunger 47, the locking lever 49 pivots about the pivot shaft 49a so as to set the locking claw 49c to the position where the locking claw 49c can be engaged with one of the ratchet teeth 44b as mentioned above.

By the rotation of the internal gear 44 in the belt withdrawing direction CW, the ratchet teeth 44b and the locking claw 49c are engaged with each other, thereby stopping the rotation of the internal gear 44. In this manner, as the motor 10 is driven, the locking lever 49 is rapidly actuated to stop the rotation of the internal gear 44 in the belt withdrawing direction CW, thereby turning ON the power transmission path between the reel 4 and the motor 10. That is, the belt tension mechanism is set in the operative state.

Since the planetary gears 39 and 40 rotate about their axes by the driving torque of the motor 10 as mentioned above, the stop of the rotation of the internal gear 44 makes the planetary gears 39 and 40 to start moving around the sun gear 43 along the internal teeth 44a of the internal gear 44 in the belt winding direction CCW with reducing the rotational speed. Therefore, the first and second carriers 38 and 56 rotate in the belt winding direction CCW at a speed equal to the moving speed of the planetary gears 39 and 40, so that the reel 4 rotates in the belt winding direction CCW. In this manner, the rotation of the motor 10 is transmitted to the reel 4 with reducing the rotational speed by the reduction gear mechanism 12, thereby rotating the reel 4.

By the rotation of the reel 4 in the belt winding direction CCW, the seat belt 3 is forcibly wound onto the reel 4 by the torque of the motor 10, thereby adjusting the belt tension. The motor control unit controls the motor 10 according to various information of the vehicle including information about the running condition of the vehicle such as running speed and acceleration, and information about the operational condition of the vehicle such as pedaling speed of a brake pedal and pedaling speed of a throttle pedal so as to control the winding amount of the seat belt 3 to a desired amount, thereby setting the belt tension to a desired value.

Since the second carrier 56 rotates in the belt winding direction CCW, the return spring 54 is loosened, so that the spring force of the return spring 54 is reduced.

(4) Action of Releasing the Forcible Winding of the Seat Belt

As the motor 10 is driven in a direction opposite to that of (3), i.e. in the belt withdrawing direction CW, in the state of forcible winding of the seat belt in (3), the reel 4 rotates in the belt withdrawing direction CW via the respective gears 36, 37, 45, 43, 39 and 40 and the first and second carriers 38, 56, thereby loosening the forcible winding of the seat belt 3. The switch gear 46 rotates reversely by the rotation of the connecting gear 37. At this time, since the large connecting gear 37a and the switch gear 46 mesh with each other through helical gears, thrust acts on the switch gear 46 from the large connecting gear 37a in a direction opposite to that of (3). By the thrust, the switch gear 46 moves rightward from the state shown in FIG. 8(d). According to the movement of the switch gear 46, the upper end of the slant face 46b of the switch gear 46 passes through the position of the lower end of the slant face 47b of the plunger 47. Accordingly, the slant face 47b of the plunger 47 contacts the slant face 47b by the urging force of the spring 48 and slides along the slant face 47b, so that the plunger 47 projects. With the projecting of the plunger 47, the locking lever actuating portion 47d of the plunger 47 makes the locking lever 49 to pivot toward the inoperative position.

Finally, the switch gear 46 and plunger 47 are set in the inoperative state shown in FIG. 8(b). In the inoperative state, the locking lever 49 becomes in the inoperative state where the locking claw 49c is not engaged with any of the ratchet teeth 44b of the internal gear 44 in the non-engaging position. Accordingly, the internal gear 44 becomes free to rotate, so that the reel 4 and the motor 10 are independent from each other to rotate freely.

In the seat belt retractor 1 of the first embodiment, the belt tension of the seat belt 3 is controlled by the torque of the motor 10 of the belt tension mechanism controlled by the motor control unit according to the condition of the occupant in the vehicle, the running condition outside the vehicle, or the operational condition of the seat belt 3.

In the first embodiment, the locking device 5, the lock activating mechanism 6, the EA mechanism 7, and the deceleration detecting means 8 in the seat belt retractor 1 take the same actions as those of a conventional one. The actions will be explained next.

When deceleration exceeding a predetermined value acts on the vehicle while the seat belt apparatus is worn, the inertia mass 30 of the deceleration detecting means 8 tilts and the actuator 31 pivots, so that the locking claw 31c becomes in the position where the locking claw 31c can be engaged with one of the external teeth 21b of the lock gear 21. By the deceleration of the vehicle, the seat belt 3 tends to be withdrawn by forward inertia of the occupant. While all of the reel 4, the torsion bar 26, the locking base 19, and lock gear 21 try to rotate in the belt withdrawing direction CW, the locking claw 31c is engaged with one of the external teeth 21b so as to stop the rotation of the lock gear 21 of the lock activating mechanism 6 in the belt withdrawing direction CW. Accordingly, only the reel 4, the torsion bar 26, and locking base 19 rotate in the belt withdrawing direction CW. Accordingly, a rotational difference (relative rotation) is generated between the locking base 19 and the lock gear 21, so that the pawl 20 of the locking device 5 pivots. Therefore, the locking claw 20b of the pawl 20 is engaged with one of the internal teeth 18a of the internal teeth member 18 of the frame 2. As a result, the rotation of the reel 4 in the belt withdrawing direction CW is blocked so as to stop the withdrawal of the seat belt 3, thereby preventing inertia movement of the occupant.

As the deceleration of the vehicle is increased, the inertia of the occupant is increased. Accordingly, the torsion bar 26 is twisted between the first and second torque transmission portions 26b and 26d so as to cause a rotational difference (relative rotation) between the reel 4 and the locking base 19, so that only the reel 4 rotates in the belt withdrawing direction CW for a predetermined amount. The EA mechanism 7 is actuated by the twist of the torsion bar 26 to absorb impact on the occupant from the seat belt 3. During this, the torque of the reel 4 acts on the second torque transmission portion 27d, so that the stopper 27 rotates relative to the locking base 19. The stopper 27 thus moves in the axial direction closer to the disk portion 19a of the locking base 19 in such a manner that the side face of the stopper 27 does not go far enough to contact the disk portion 19a.

As the deceleration of the vehicle becomes extremely large, the inertia of the occupant also becomes extremely large. In this case, the rotational difference between the reel 4 and the locking base 19 becomes extremely large, so that the stopper 27 rotates largely and thus moves largely in the axial direction so as to bring the side face of the stopper 27 in contact with the disk portion 19a. Then, the relative rotation between the stopper 27 and the locking base 19 is blocked.

Therefore, the stopper 27 and the locking base 19 try to rotate together, that is, the reel 4 and the locking base 19 try to rotate together. In this manner, EA action (energy absorbing action) of the EA mechanism is finished.

Regardless of whether the seat belt apparatus is worn or not, when the seat belt 3 is withdrawn at a normal speed, all of the reel 4, the torsion bar 26, the locking base 19, and the lock gear 21 rotate together in the belt withdrawing direction CW. During this, the flywheel 22 also rotates together with the lock gear 21, and the lock gear 21 does not rotate relative to the flywheel 22. When the seat belt 3 is rapidly withdrawn at a speed exceeding the normal speed, all of the reel 4, the torsion bar 26, the locking base 19, and the lock gear 21 rotate together similarly to the normal case. Since the speed of the rotation in this case is higher than that of the normal case, the flywheel 22 delays from rotation of the lock gear 21, so that the flywheel 22 pivots relative to the lock gear 21. Therefore, the locking claw 22c of the flywheel 22 becomes in the position where the locking claw 22c can be engaged with one of the internal teeth 24e of the retainer 24.

When the lock gear 21 rotates further, the locking claw 22c is engaged with one of the internal teeth 24e of the retainer 24, thereby blocking the lock gear 21 from rotating in the belt withdrawing direction CW. As the lock gear 21 is stopped from rotating in the belt withdrawing direction CW, the reel 4 is also stopped from rotating in the belt withdrawing direction CW similarly to the aforementioned case with large deceleration. In this manner, the rapid withdrawal of the seat belt 3 is prevented.

According to the seat belt retractor 1 mentioned above, the rotation of the reel 4 is controlled by the rotational torque of the motor 10 via the power transmission gear mechanism 11 and the reduction gear mechanism 12, whereby the belt tension of the seat belt 3 can be securely and easily adjusted.

Since the ON/OFF of the power transmission path between the reel 4 and the motor 10 is controlled by the transmission path switching mechanism 13 actuated by the rotational torque of the motor 10, it is not necessary to use a special actuator and provide another power source such as a magnetic solenoid for actuating the transmission path switching mechanism 13. Therefore, the number of components of the mechanism for switching the power transmission path can be reduced, thereby further simplifying the structure and reducing the cost.

Figure 11:
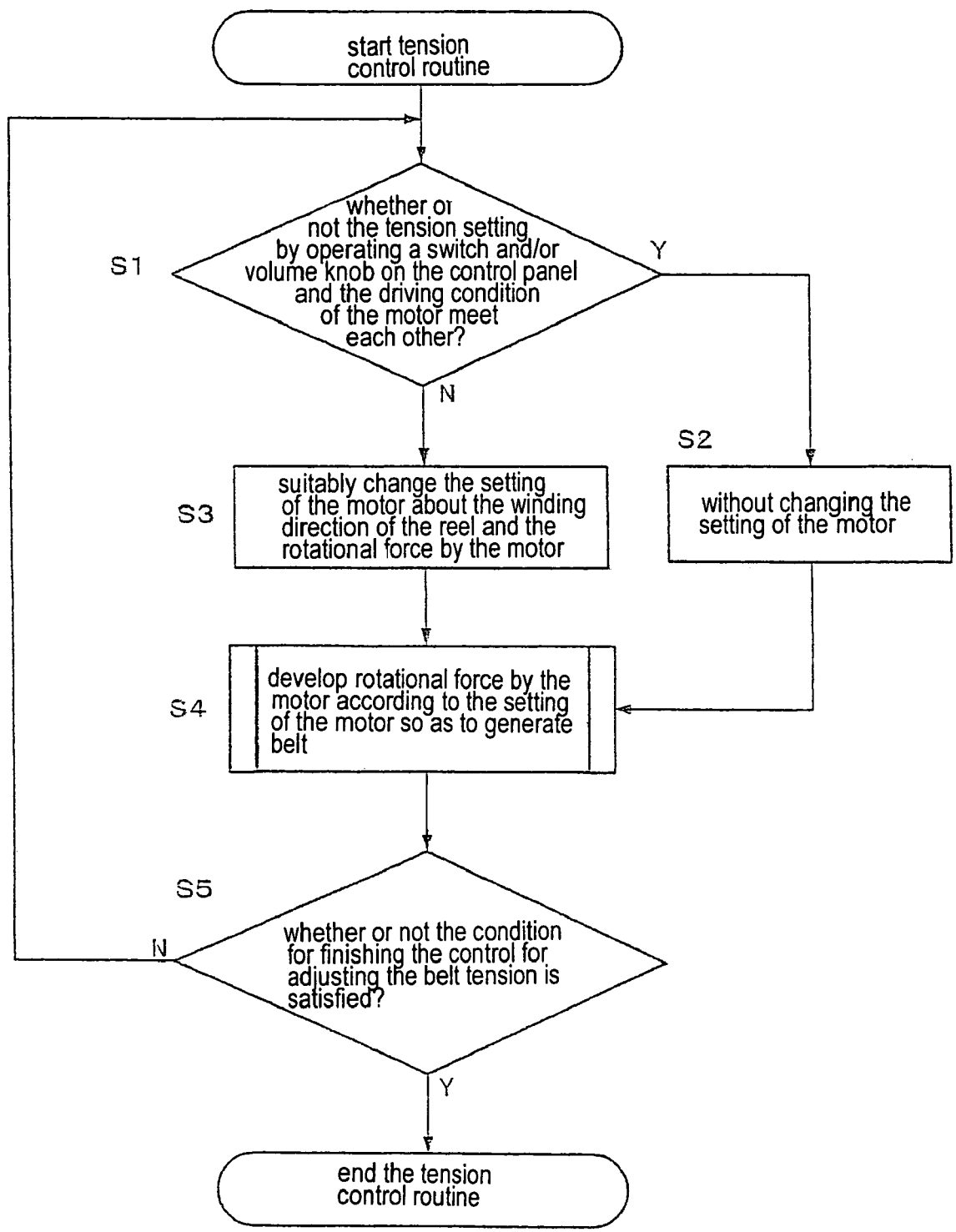
FIG. 11 is a flow chart showing a control for adjusting tension of the seat belt during fitting action of the seat belt apparatus according to the first embodiment of the present invention.

Hereinafter, an action of the seat belt apparatus 100 of the embodiment shown in FIG. 1 will be described. FIG. 11 is a flow chart showing a sub routine to be operated for fitting action when the tongue is latched with the buckle, so that a signal indicating that the seat belt is worn is output from the buckle switch 103. The sub routine is a control for adjusting tension of the seat belt 3 by the motor control unit 101. It should be noted that each step is designated as S in FIG. 11.

First, in Step S1, it is determined whether the tension setting by the occupant for the belt tension and the driving condition of the motor 10 at this point meet each other. The tension setting is detected from the operational condition of a switch and/or a volume control of the control panel 102. If they meet each other, the process proceeds to S4 without changing the setting of the motor about the winding direction of the reel 4 and the driving force by the motor 10 as shown in S2. If they do not meet, the process proceeds to S3 where the setting of the motor 10 about the winding direction of the reel 4 and the driving force by the motor 10 is suitably changed and then the process proceeds to S4. In S4, driving force for rotating the reel 4 in the winding direction is developed according to the setting of the motor 10 so as to generate belt tension corresponding to the tension setting.

Then, the process proceeds to S5 where it is determined whether the condition for finishing the control for adjusting the belt tension is satisfied. Examples of the condition for finishing include a case that it is determined that the fitting action is finished because a predetermined period of time passes after the latching of the buckle (after the signal is output from the buckle switch 103), a case that it is determined that the belt tension becomes excessive because the increase of the motor current to a predetermined value or more is detected by the motor current detector 104, or a case that depression of a stop button provided on the control panel 102 is detected. The condition for finishing may be any one of these or a combination of these. If it is determined that the condition for finishing is not satisfied in S5, the process returns to S1 and the process is repeated. If it is determined that the condition for finishing is satisfied, the process is ended.

According to the seat belt apparatus 100 of the embodiment conducting such a feedback control, the rotational power of the motor 10 can be controlled by the motor control unit 101 so as to wind up the seat belt 3 with a given winding force. The occupant can change the tension on the seat belt 3 with the setting according to the occupant preference. Therefore, it can make the occupant more comfortable while driving the vehicle.

The transmission path switching mechanism 13 functions as a clutch mechanism capable of switching between the mode allowing the transmission of power to the power transmission path between the motor and the reel, and the mode halting the transmission. Accordingly, the connection between the reel 4 and the motor 10 can be isolated when the seat belt 3 is withdrawn. Therefore, there is no need to care for reversal input of the driving force to the motor 10 by the withdrawal, thereby simplifying the structure for the motor control. It should be noted that the clutch mechanism may be omitted and the motor 10 is always connected to the reel 4 via the power transmission gear mechanism 11. In this case, the power supply to the motor 10 is necessarily stopped whenever the seat belt 3 is withdrawn.

The aforementioned control is conducted as an initial setting for the belt tension in the fitting action after the latching of the tongue. The belt tension can be changed or maintained according to the occupant preference by conducting the feedback control at predetermined intervals while driving the vehicle.

Figure 12:
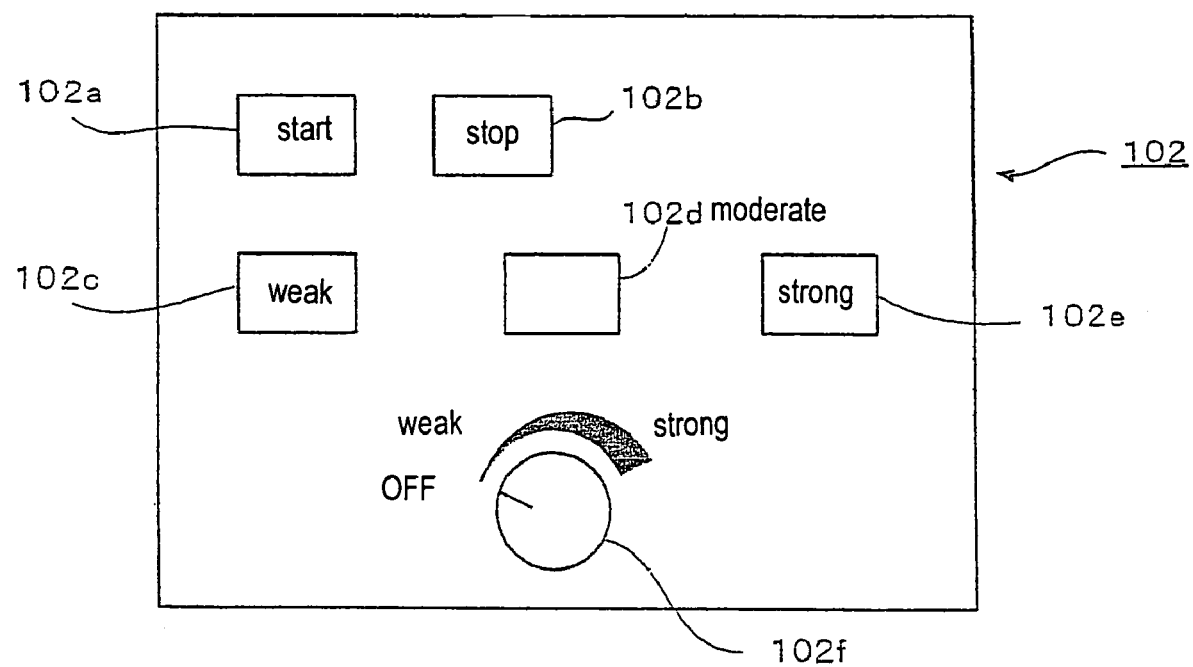
FIG. 12 is a view showing an example of switches provided on a control panel.

Examples of switches provided on the control panel 102 as a setting apparatus include, as shown in FIG. 12, a start switch 102a and a stop switch 102b for adjustment control for belt tension, a weak tension select switch 102c, a moderate tension select switch 102d, and a strong tension select switch 102e for stepwise setting of the belt tension; and a tension volume knob 102f for allowing continuous variable setting of belt tension. Each of the switches can output a command signal for conducting a corresponding predetermined operation to the motor control unit 101.

Figure 13:
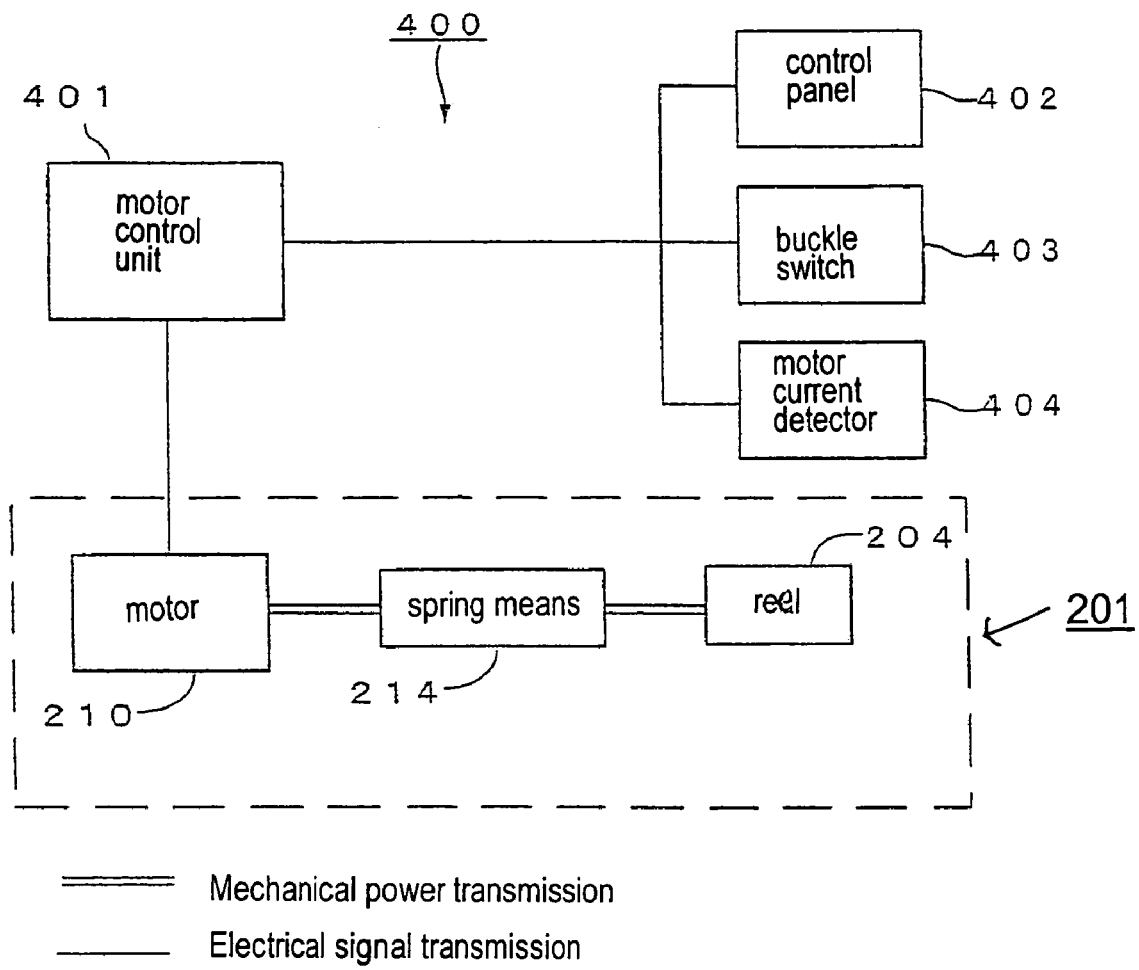
FIG. 13 is a schematic block diagram showing a seat belt apparatus according to a second embodiment of the present invention.

Hereinafter, a seat belt apparatus according to a second embodiment of the present invention will be described. FIG. 13 is a schematic block diagram showing a structure of the seat belt apparatus according to the second embodiment. In FIG. 13, a seat belt apparatus 400 of the second embodiment comprises a seat belt retractor 201; a motor control unit 401; a control panel 402; a buckle switch 403; and motor current detector 404. The seat belt retractor 201 comprises a motor 210, a reel 204, and a spring device 214.

A difference in the structure from the seat belt apparatus 100 of the first embodiment is that the motor 210 of the seat belt retractor 201 is connected to the reel 204 via the spring device 214 (instead of the power transmission device 105). Since other components are the same as those in the first embodiment, the description thereof will be omitted.

Figure 14:
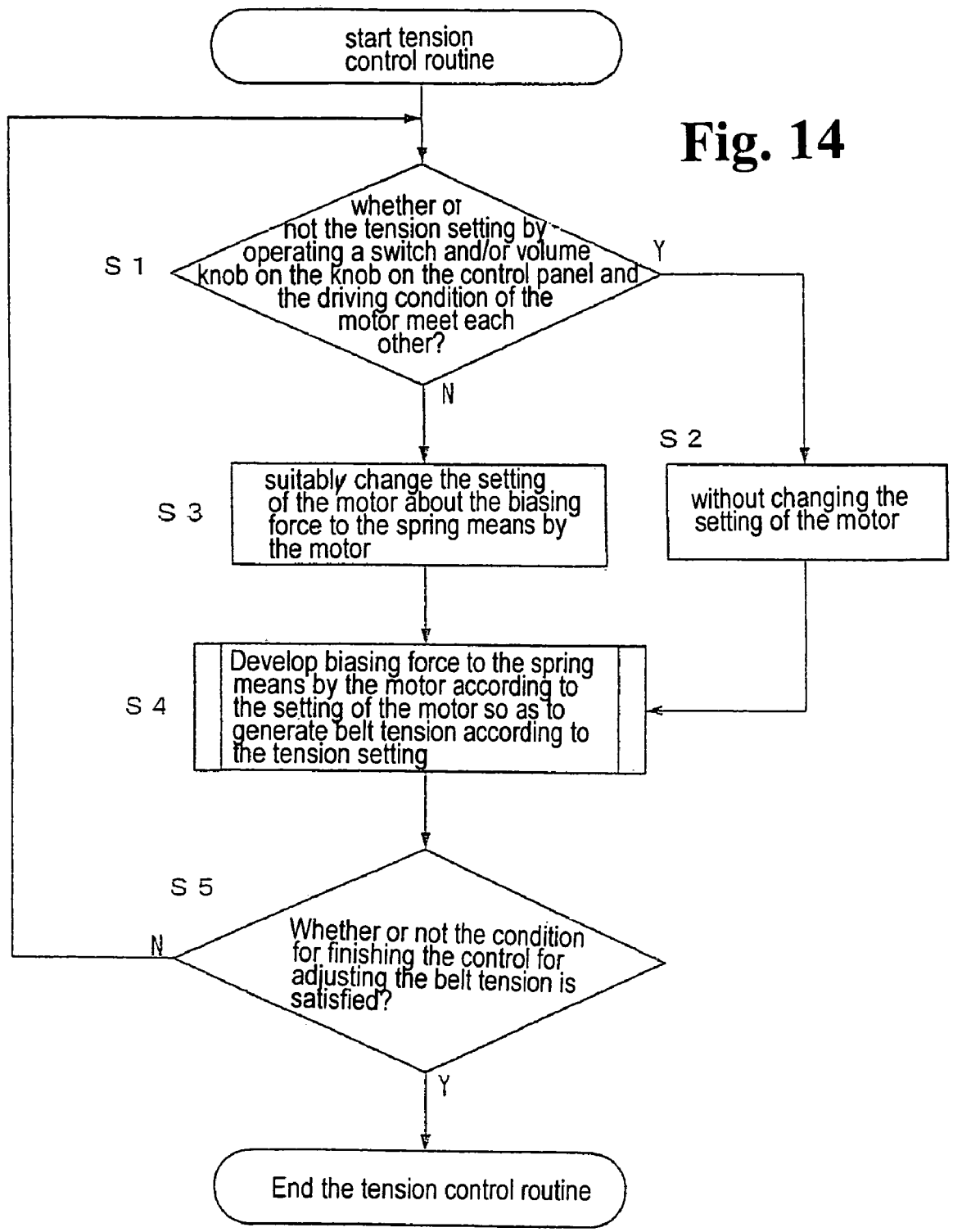
FIG. 14 is a flow chart showing a control for adjusting tension of a seat belt during fitting action of the seat belt apparatus according to the second embodiment.

Hereinafter, an action of the seat belt apparatus 400 of the embodiment shown in FIG. 13 will be described. FIG. 14 is a flow chart showing a sub routine to be operated for fitting action, that is, a control for adjusting tension of the seat belt by the motor control unit 401. The second embodiment is different from the first embodiment shown in FIG. 11 such that the steps S2, S3, and S4 are replaced by steps S2', S3', and S4' in FIG. 14. The description will be made as regard to these different steps only.

In S2', the process proceeds to S4' without changing the setting of the motor about the urging force to the spring device 214 by the motor 210. In S3', the process proceeds to S4' after suitably changing the setting of the motor about the urging force to the spring device 214 by the motor 210. In S4', urging force to the spring device 214 by the motor 210 is generated according to the setting of the motor, thereby generating the belt tension according to the setting of tension. Other steps are the same as those in the first embodiment.

It should be noted that there is no special limitation on kind of the motor 210. The motor 210 may be an ultrasonic motor.

According to the seat belt apparatus 400 of the embodiment conducting the feedback control, the occupant can change the tension on the seat belt with the setting according to the occupant preference, similarly to the first embodiment. Therefore, it can make the occupant more comfortable while driving the vehicle.

The disclosure of Japanese Patent Application No. 2004-213159, filed on Jul. 21, 2004, is incorporated in the application.

While the invention has been explained with reference to the specific embodiments of the invention, the explanation is illustrative and the invention is limited only by the appended claims.

What is claimed is:

1. A seat belt retractor comprising:
a reel for winding a seat belt,
a spring attached to the reel for rotating the reel in a belt winding direction,
a motor attached to the reel for generating rotational power capable of rotating the reel in the belt winding direction,
a motor control unit for controlling the motor to wind the seat belt with a desired winding force, and
a setting unit connected to the motor control unit and having a setting switch for setting the desired winding force of the motor in a fitting condition when the seat belt is initially worn so that the motor rotates the reel to wind the seat belt at the desired winding force,
wherein said setting switch comprises a plurality of tension select switches for selecting strength of the tension of the seat belt and a tension setting knob for variably setting the tension of the seat belt.

2. A seat belt retractor according to claim 1, wherein said setting switch further comprises a start switch and a stop switch for adjustment control of the seat belt.

3. A seat belt apparatus comprising the seat belt retractor according to claim 1, a seat belt having an end fixed to the reel, a tongue attached to the seat belt, and a buckle for engaging the tongue.

* * * * *